United States Patent
Stevens et al.

(10) Patent No.: US 12,153,150 B2
(45) Date of Patent: *Nov. 26, 2024

(54) DOPPLER NULLING SCANNING (DNS) SECURITY (SPATIAL AWARENESS)

(71) Applicant: Rockwell Collins, Inc., Cedar Rapids, IA (US)

(72) Inventors: James A. Stevens, Lucas, TX (US); Eric J. Loren, North Liberty, IA (US); William B. Sorsby, Cedar Rapids, IA (US); Tj T. Kwon, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/199,760

(22) Filed: May 19, 2023

(65) Prior Publication Data

US 2024/0168120 A1    May 23, 2024

Related U.S. Application Data

(63) Continuation of application No. 18/198,671, filed on May 17, 2023, which is a continuation-in-part of
(Continued)

(51) Int. Cl.
*H04W 56/00*    (2009.01)
*G01S 5/00*    (2006.01)
(Continued)

(52) U.S. Cl.
CPC .......... *G01S 5/0027* (2013.01); *G01S 13/583* (2013.01); *G01S 13/62* (2013.01);
(Continued)

(58) Field of Classification Search
CPC ......... H04W 56/0035; H04W 56/0015; H04W 56/005; G01S 5/0027; G01S 13/583; G01S 13/62
See application file for complete search history.

(56) References Cited

U.S. PATENT DOCUMENTS

| 3,025,519 A | 3/1962 | Brown et al. |
| 4,134,113 A | 1/1979 | Powell |

(Continued)

FOREIGN PATENT DOCUMENTS

| CN | 101330448 A | 12/2008 |
| CN | 101465793 A | 6/2009 |

(Continued)

OTHER PUBLICATIONS

U.S. Appl. No. 17/233,107, filed Apr. 4, 2021, Eric J. Loren.
(Continued)

*Primary Examiner* — Dominic E Rego
(74) *Attorney, Agent, or Firm* — Suiter Swantz IP

(57) ABSTRACT

A system is disclosed for Doppler nulling configured for security. The system may include a receiver or transmitter node. The receiver or transmitter node may include a communications interface with an antenna element and a controller. The controller may include one or more processors and have information of own node velocity and own node orientation relative to a common reference frame. The receiver or transmitter node may be time synchronized to apply Doppler corrections to signals, the Doppler corrections associated with the receiver or transmitter node's own motions relative to the common reference frame, the Doppler corrections applied using Doppler null steering along Null directions based on a protocol. The protocol may include a protocol modulation, such as a modulation of the signals for security purposes.

20 Claims, 9 Drawing Sheets

Related U.S. Application Data application No. 18/198,025, filed on May 16, 2023, and a continuation-in-part of application No. 18/198,152, filed on May 16, 2023, said application No. 18/198,025 is a continuation-in-part of application No. 18/196,912, filed on May 12, 2023, and a continuation-in-part of application No. 18/196,931, filed on May 12, 2023, said application No. 18/198,152 is a continuation-in-part of application No. 18/196,807, filed on May 12, 2023, and a continuation-in-part of application No. 18/196,936, filed on May 12, 2023, and a continuation-in-part of application No. 18/196,765, filed on May 12, 2023, and a continuation-in-part of application No. 18/196,944, filed on May 12, 2023, and a continuation-in-part of application No. 18/196,786, filed on May 12, 2023, said application No. 18/198,025 is a continuation-in-part of application No. 18/196,936, filed on May 12, 2023, and a continuation-in-part of application No. 18/196,765, filed on May 12, 2023, and a continuation-in-part of application No. 18/196,807, filed on May 12, 2023, said application No. 18/198,152 is a continuation-in-part of application No. 18/196,931, filed on May 12, 2023, said application No. 18/198,025 is a continuation-in-part of application No. 18/196,786, filed on May 12, 2023, said application No. 18/198,152 is a continuation-in-part of application No. 18/196,912, filed on May 12, 2023, said application No. 18/198,025 is a continuation-in-part of application No. 18/196,944, filed on May 12, 2023, said application No. 18/196,912 is a continuation-in-part of application No. 18/134,950, filed on Apr. 14, 2023, said application No. 18/196,807 is a continuation-in-part of application No. 18/134,950, filed on Apr. 14, 2023, said application No. 18/196,786 is a continuation-in-part of application No. 18/134,950, filed on Apr. 14, 2023, said application No. 17/196,931 is a continuation-in-part of application No. 18/134,950, filed on Apr. 14, 2023, said application No. 18/196,944 is a continuation-in-part of application No. 18/134,950, filed on Apr. 14, 2023, said application No. 18/196,936 is a continuation-in-part of application No. 18/134,950, filed on Apr. 14, 2023, said application No. 18/196,765 is a continuation-in-part of application No. 18/134,950, filed on Apr. 14, 2023, said application No. 18/196,912 is a continuation-in-part of application No. 18/130,285, filed on Apr. 3, 2023, said application No. 18/196,936 is a continuation-in-part of application No. 18/130,285, filed on Apr. 3, 2023, said application No. 18/196,765 is a continuation-in-part of application No. 18/130,285, filed on Apr. 3, 2023, said application No. 18/196,944 is a continuation-in-part of application No. 18/130,285, filed on Apr. 3, 2023, said application No. 18/196,786 is a continuation-in-part of application No. 18/130,285, filed on Apr. 3, 2023, said application No. 18/196,931 is a continuation-in-part of application No. 18/130,285, filed on Apr. 3, 2023, said application No. 18/196,807 is a continuation-in-part of application No. 18/130,285, filed on Apr. 3, 2023, which is a continuation-in-part of application No. 17/990,491, filed on Nov. 18, 2022, which is a continuation-in-part of application No. 17/957,881, filed on Sep. 30, 2022, and a continuation-in-part of application No. 17/941,907, filed on Sep. 9, 2022, which is a continuation-in-part of application No. 17/940,898, filed on Sep. 8, 2022, said application No. 17/957,881 is a continuation-in-part of application No. 17/857,920, filed on Jul. 5, 2022, said application No. 17/940,898 is a continuation-in-part of application No. 17/857,920, filed on Jul. 5, 2022, said application No. 17/957,881 is a continuation-in-part of application No. 17/846,625, filed on Jun. 22, 2022, said application No. 17/857,920 is a continuation-in-part of application No. PCT/US2022/024653, filed on Apr. 13, 2022, and a continuation of application No. 17/541,703, filed on Dec. 3, 2021, said application No. 18/134,950 is a continuation of application No. 17/534,061, filed on Nov. 23, 2021, now Pat. No. 11,665,658, said application No. 17/857,920 is a continuation of application No. 17/534,061, filed on Nov. 23, 2021, now Pat. No. 11,665,658, said application No. 17/541,703 is a continuation-in-part of application No. 17/408,156, filed on Aug. 20, 2021, now Pat. No. 11,737,121, and a continuation-in-part of application No. 17/233,107, filed on Apr. 16, 2021, now Pat. No. 11,726,162, said application No. PCT/US2022/024653 is a continuation of application No. 17/233,107, filed on Apr. 16, 2021, now Pat. No. 11,726,162, said application No. 17/541,703 is a continuation-in-part of application No. 17/079,175, filed on Oct. 23, 2020, now Pat. No. 11,304,084, and a continuation-in-part of application No. 17/020,231, filed on Sep. 14, 2020, now Pat. No. 11,296,966, which is a continuation-in-part of application No. 16/987,671, filed on Aug. 7, 2020, now Pat. No. 11,290,942, and a continuation-in-part of application No. 16/698,230, filed on Nov. 27, 2019, now Pat. No. 10,999,778.

(60) Provisional application No. 63/400,138, filed on Aug. 23, 2022, provisional application No. 63/344,445, filed on May 20, 2022.

(51) Int. Cl.
    *G01S 13/58*     (2006.01)
    *G01S 13/62*     (2006.01)

(52) U.S. Cl.
    CPC ... *H04W 56/0015* (2013.01); *H04W 56/0035* (2013.01); *H04W 56/005* (2013.01)

(56) References Cited

U.S. PATENT DOCUMENTS

| | | |
|---|---|---|
| 4,399,531 A | 8/1983 | Grande et al. |
| 4,806,934 A | 2/1989 | Magoon |
| 5,835,482 A | 11/1998 | Allen |
| 5,898,902 A | 4/1999 | Tuzov |
| 6,008,758 A | 12/1999 | Campbell |
| 6,072,425 A | 6/2000 | Vopat |
| 6,115,394 A | 9/2000 | Balachandran et al. |
| 6,195,403 B1 | 2/2001 | Anderson et al. |
| 6,496,940 B1 | 12/2002 | Horst et al. |
| 6,611,773 B2 | 8/2003 | Przydatek et al. |
| 6,662,229 B2 | 12/2003 | Passman et al. |
| 6,718,174 B2 | 4/2004 | Vayanos |
| 6,721,290 B1 | 4/2004 | Kondylis et al. |
| 6,744,740 B2 | 6/2004 | Chen |
| 6,845,091 B2 | 1/2005 | Ogier et al. |
| 7,023,818 B1 | 4/2006 | Elliott |
| 7,171,476 B2 | 1/2007 | Maeda et al. |
| 7,242,671 B2 | 7/2007 | Li et al. |
| 7,272,472 B1 | 9/2007 | McElreath |
| 7,299,013 B2 | 11/2007 | Rotta et al. |
| 7,343,170 B1 | 3/2008 | Feeney et al. |

(56) References Cited

U.S. PATENT DOCUMENTS

| | | |
|---|---|---|
| 7,417,948 B2 | 8/2008 | Sjöblom |
| 7,418,343 B1 | 8/2008 | McGraw et al. |
| 7,558,575 B2 | 7/2009 | Losh et al. |
| 7,573,835 B2 | 8/2009 | Sahinoglu et al. |
| 7,633,921 B2 | 12/2009 | Thubert et al. |
| 7,639,652 B1 | 12/2009 | Amis et al. |
| 7,679,551 B2 | 3/2010 | Petovello et al. |
| 7,698,463 B2 | 4/2010 | Ogier et al. |
| 7,719,989 B2 | 5/2010 | Yau |
| 7,729,240 B1 | 6/2010 | Crane et al. |
| 7,787,450 B1 | 8/2010 | Chan et al. |
| 7,881,229 B2 | 2/2011 | Weinstein et al. |
| 7,903,662 B2 | 3/2011 | Cohn |
| 7,983,239 B1 | 7/2011 | Weinstein et al. |
| 8,010,287 B1 | 8/2011 | Frank et al. |
| 8,036,224 B2 | 10/2011 | Axelsson et al. |
| 8,121,741 B2 | 2/2012 | Taft et al. |
| 8,138,626 B2 | 3/2012 | Jonsson et al. |
| 8,159,397 B2 | 4/2012 | Feller et al. |
| 8,159,954 B2 | 4/2012 | Larsson et al. |
| 8,217,836 B1 | 7/2012 | Anderson et al. |
| 8,218,550 B2 | 7/2012 | Axelsson et al. |
| 8,223,660 B2 | 7/2012 | Allan et al. |
| 8,223,868 B2 | 7/2012 | Lee |
| 8,341,289 B2 | 12/2012 | Hellhake et al. |
| 8,369,445 B2 | 2/2013 | Hensley |
| 8,396,686 B2 | 3/2013 | Song et al. |
| 8,490,175 B2 | 7/2013 | Barton et al. |
| 8,553,560 B2 | 10/2013 | Axelsson et al. |
| 8,599,956 B1 | 12/2013 | Mitchell |
| 8,614,997 B1 | 12/2013 | Herder |
| 8,630,291 B2 | 1/2014 | Shaffer et al. |
| 8,638,008 B2 | 1/2014 | Baldwin et al. |
| 8,717,230 B1 | 5/2014 | Fischi et al. |
| 8,717,935 B2 | 5/2014 | Lindem, III et al. |
| 8,732,338 B2 | 5/2014 | Hutchison et al. |
| 8,798,034 B2 | 8/2014 | Aggarwal et al. |
| 8,824,444 B1 | 9/2014 | Berenberg et al. |
| 8,849,596 B2 | 9/2014 | Ting et al. |
| 8,867,427 B2 | 10/2014 | Taori et al. |
| 8,880,001 B1 | 11/2014 | Hwang et al. |
| 8,909,471 B1 | 12/2014 | Jinkins et al. |
| 8,913,543 B2 | 12/2014 | Zainaldin |
| 8,942,197 B2 | 1/2015 | Rudnick et al. |
| 8,964,739 B1 | 2/2015 | Wisehart |
| 8,989,326 B2 | 3/2015 | An et al. |
| 9,075,126 B2 | 7/2015 | Robinson |
| 9,179,475 B2 | 11/2015 | Koleszar et al. |
| 9,213,387 B2 | 12/2015 | King et al. |
| 9,246,795 B2 | 1/2016 | Madaiah et al. |
| 9,264,126 B2 | 2/2016 | Foster et al. |
| 9,294,159 B2 | 3/2016 | Duerksen |
| 9,304,198 B1 | 4/2016 | Doerry et al. |
| 9,325,513 B2 | 4/2016 | Liu et al. |
| 9,345,029 B2 | 5/2016 | Monte et al. |
| 9,355,564 B1 | 5/2016 | Tyson et al. |
| 9,430,947 B2 | 8/2016 | Richardson et al. |
| 9,435,884 B2 | 9/2016 | Inoue |
| 9,516,513 B2 | 12/2016 | Saegrov et al. |
| 9,523,761 B1 | 12/2016 | Hoffmann et al. |
| 9,544,162 B2 | 1/2017 | Vasseur et al. |
| 9,621,208 B1 | 4/2017 | Snodgrass et al. |
| 9,628,285 B2 | 4/2017 | Császár |
| 9,693,330 B1 | 6/2017 | Snodgrass et al. |
| 9,696,407 B1 | 7/2017 | Greenleaf et al. |
| 9,713,061 B2 | 7/2017 | Ruiz et al. |
| 9,719,803 B2 | 8/2017 | Ratcliff et al. |
| 9,766,339 B2 | 9/2017 | Robinson et al. |
| 9,858,822 B1 | 1/2018 | Gentry |
| 9,883,348 B1 | 1/2018 | Walker et al. |
| 9,979,462 B2 | 5/2018 | Watson et al. |
| 9,979,635 B2 | 5/2018 | Hellhake et al. |
| 10,067,199 B2 | 9/2018 | Eldridge et al. |
| 10,097,469 B2 | 10/2018 | Hui et al. |
| 10,098,051 B2 | 10/2018 | Mosko et al. |
| 10,205,654 B2 | 2/2019 | Choi et al. |
| 10,236,648 B2 | 3/2019 | Irons et al. |
| 10,257,655 B2 | 4/2019 | Cody |
| 10,365,376 B2 | 7/2019 | Lee et al. |
| 10,382,897 B1 | 8/2019 | Lanes et al. |
| 10,455,521 B2 | 10/2019 | Hudson et al. |
| 10,459,074 B1 | 10/2019 | Omer et al. |
| 10,484,837 B2 | 11/2019 | Navalekar et al. |
| 10,509,130 B2 | 12/2019 | Snyder et al. |
| 10,531,500 B2 | 1/2020 | Ulinskas |
| 10,601,684 B2 | 3/2020 | Hashmi et al. |
| 10,601,713 B1 | 3/2020 | Turgeman et al. |
| 10,609,622 B2 | 3/2020 | Bader et al. |
| 10,620,296 B1 | 4/2020 | Ezal et al. |
| 10,622,713 B2 | 4/2020 | Ma |
| 10,650,688 B1 | 5/2020 | DeRoche |
| 10,719,076 B1 | 7/2020 | Gavrilets et al. |
| 10,785,672 B2 | 9/2020 | Kwan et al. |
| 10,798,053 B2 | 10/2020 | Nolan et al. |
| 10,838,070 B1 | 11/2020 | Chapman et al. |
| 10,871,575 B2 | 12/2020 | Petrovic et al. |
| 10,873,429 B1 | 12/2020 | Kwon et al. |
| 10,908,277 B1 | 2/2021 | Roggendorf et al. |
| 10,931,570 B1 | 2/2021 | Kwon et al. |
| 10,965,584 B1 | 3/2021 | Kwon et al. |
| 10,979,348 B1 | 4/2021 | Kwon et al. |
| 10,993,201 B2 | 4/2021 | Luecke |
| 10,999,778 B1 | 5/2021 | Kwon et al. |
| 11,071,039 B2 | 7/2021 | Fallon et al. |
| 11,073,622 B2 | 7/2021 | Cohen |
| 11,082,324 B2 | 8/2021 | Ramanathan et al. |
| 11,129,078 B2 | 9/2021 | Yates et al. |
| 11,258,520 B2 | 2/2022 | Goergen et al. |
| 11,284,295 B1 | 3/2022 | Kwon et al. |
| 11,290,942 B2 | 3/2022 | Kwon et al. |
| 11,411,613 B2 | 8/2022 | Jorgenson et al. |
| 11,415,664 B2 | 8/2022 | Hammes et al. |
| 11,443,638 B2 | 9/2022 | Byxbe |
| 11,500,111 B2 | 11/2022 | Frederiksen et al. |
| 11,528,675 B2 | 12/2022 | Nagaraja et al. |
| 11,536,850 B2 | 12/2022 | Sharma et al. |
| 11,665,658 B1 | 5/2023 | Sorsby et al. |
| 2002/0018448 A1 | 2/2002 | Amis et al. |
| 2003/0035589 A1 | 2/2003 | Kim |
| 2003/0151513 A1 | 8/2003 | Herrmann et al. |
| 2004/0012859 A1 | 1/2004 | Minefuji |
| 2004/0028016 A1 | 2/2004 | Billhartz |
| 2004/0123228 A1 | 6/2004 | Kikuchi et al. |
| 2004/0213239 A1 | 10/2004 | Lin et al. |
| 2004/0246902 A1 | 12/2004 | Weinstein et al. |
| 2005/0025076 A1 | 2/2005 | Chaudhuri et al. |
| 2006/0010170 A1 | 1/2006 | Lashley et al. |
| 2006/0056421 A1 | 3/2006 | Zaki |
| 2007/0086541 A1 | 4/2007 | Moon et al. |
| 2007/0097880 A1 | 5/2007 | Rajsic |
| 2007/0109182 A1 | 5/2007 | Budic |
| 2007/0109979 A1 | 5/2007 | Fu et al. |
| 2007/0223497 A1 | 9/2007 | Elson et al. |
| 2007/0299950 A1 | 12/2007 | Kulkarni |
| 2008/0107034 A1 | 5/2008 | Jetcheva et al. |
| 2008/0117904 A1 | 5/2008 | Radha et al. |
| 2008/0219204 A1 | 9/2008 | Lee et al. |
| 2008/0273582 A1 | 11/2008 | Gaal et al. |
| 2008/0291945 A1 | 11/2008 | Luo |
| 2008/0310325 A1 | 12/2008 | Yang |
| 2009/0086713 A1 | 4/2009 | Luo |
| 2009/0271054 A1 | 10/2009 | Dokken |
| 2009/0290572 A1 | 11/2009 | Gonia et al. |
| 2009/0318138 A1 | 12/2009 | Zeng et al. |
| 2010/0074101 A1 | 3/2010 | Skalecki et al. |
| 2010/0074141 A1 | 3/2010 | Nguyen |
| 2011/0006913 A1 | 1/2011 | Chen et al. |
| 2011/0013487 A1 | 1/2011 | Zhou et al. |
| 2011/0188378 A1 | 8/2011 | Collins et al. |
| 2011/0312279 A1 | 12/2011 | Tsai et al. |
| 2012/0092208 A1 | 4/2012 | LeMire et al. |
| 2012/0098699 A1 | 4/2012 | Calmettes et al. |
| 2013/0006834 A1 | 1/2013 | Waelbroeck et al. |
| 2013/0069834 A1 | 3/2013 | Duerksen |

(56) References Cited

U.S. PATENT DOCUMENTS

| | | |
|---|---|---|
| 2013/0094366 A1 | 4/2013 | Lee et al. |
| 2013/0100942 A1 | 4/2013 | Rudnick et al. |
| 2013/0195017 A1 | 8/2013 | Jamadagni et al. |
| 2013/0197835 A1 | 8/2013 | Jonsson et al. |
| 2013/0250808 A1 | 9/2013 | Hui et al. |
| 2014/0017196 A1 | 1/2014 | Han et al. |
| 2014/0018097 A1 | 1/2014 | Goldstein |
| 2014/0029704 A1 | 1/2014 | Becker |
| 2014/0188990 A1 | 7/2014 | Fulks |
| 2014/0229519 A1 | 8/2014 | Dietrich et al. |
| 2014/0236483 A1 | 8/2014 | Beaurepaire et al. |
| 2014/0258201 A1 | 9/2014 | Finlow-Bates |
| 2014/0292568 A1 | 10/2014 | Fleming et al. |
| 2015/0010153 A1 | 1/2015 | Robertson |
| 2015/0025818 A1 | 1/2015 | Das et al. |
| 2015/0222479 A1 | 8/2015 | Kim et al. |
| 2015/0296335 A1 | 10/2015 | Joshi et al. |
| 2015/0326689 A1 | 11/2015 | Leppänen et al. |
| 2016/0139241 A1 | 5/2016 | Holz et al. |
| 2016/0150465 A1 | 5/2016 | Jung et al. |
| 2016/0187458 A1 | 6/2016 | Shah et al. |
| 2016/0189381 A1 | 6/2016 | Rhoads |
| 2016/0373997 A1 | 12/2016 | Petersen et al. |
| 2017/0111266 A1 | 4/2017 | Ko |
| 2017/0111771 A1 | 4/2017 | Haque et al. |
| 2017/0134227 A1 | 5/2017 | Song et al. |
| 2017/0149658 A1 | 5/2017 | Rimhagen et al. |
| 2018/0013665 A1 | 1/2018 | Ko et al. |
| 2018/0026475 A1 | 1/2018 | Gelonese et al. |
| 2018/0098263 A1 | 4/2018 | Luo et al. |
| 2018/0146489 A1 | 5/2018 | Jin et al. |
| 2018/0234336 A1 | 8/2018 | Schumm et al. |
| 2018/0302807 A1 | 10/2018 | Chen et al. |
| 2018/0317226 A1 | 11/2018 | Sakoda |
| 2019/0098625 A1 | 3/2019 | Johnson et al. |
| 2019/0222302 A1 | 7/2019 | Lin et al. |
| 2019/0251848 A1 | 8/2019 | Sivanesan et al. |
| 2019/0317207 A1 | 10/2019 | Schroder et al. |
| 2019/0349172 A1 | 11/2019 | Zhang |
| 2020/0011968 A1 | 1/2020 | Hammes et al. |
| 2020/0052997 A1 | 2/2020 | Ramanathan et al. |
| 2020/0092949 A1 | 3/2020 | Donepudi et al. |
| 2020/0196309 A1 | 6/2020 | Amouris |
| 2020/0236607 A1 | 7/2020 | Zhu et al. |
| 2020/0292706 A1 | 9/2020 | Hexsel et al. |
| 2020/0350983 A1 | 11/2020 | Alasti et al. |
| 2020/0371247 A1 | 11/2020 | Marmet |
| 2020/0396708 A1 | 12/2020 | Bharadwaj et al. |
| 2021/0083917 A1 | 3/2021 | Konishi et al. |
| 2021/0153097 A1 | 5/2021 | Du et al. |
| 2021/0201044 A1 | 7/2021 | Herdade et al. |
| 2021/0302956 A1 | 9/2021 | Sudhakaran et al. |
| 2021/0359752 A1 | 11/2021 | Wang et al. |
| 2021/0385879 A1 | 12/2021 | Mahalingam et al. |
| 2021/0405176 A1 | 12/2021 | Luo |
| 2022/0015101 A1 | 1/2022 | Gallagher et al. |
| 2022/0021702 A1 | 1/2022 | Bouthemy |
| 2022/0030511 A1 | 1/2022 | Wang et al. |
| 2022/0038139 A1 | 2/2022 | Löwenmark et al. |
| 2022/0060959 A1 | 2/2022 | Atungsiri et al. |
| 2022/0069901 A1 | 3/2022 | Tian et al. |
| 2022/0085892 A1 | 3/2022 | Sorge |
| 2022/0086818 A1 | 3/2022 | Nam et al. |
| 2022/0094634 A1 | 3/2022 | Kwon et al. |
| 2022/0143428 A1 | 5/2022 | Goetz et al. |
| 2022/0159741 A1 | 5/2022 | Hoang et al. |
| 2022/0173799 A1 | 6/2022 | Wigard et al. |
| 2022/0198351 A1 | 6/2022 | Beaurepaire et al. |
| 2022/0268916 A1 | 8/2022 | Nagpal |
| 2022/0286254 A1 | 9/2022 | Cha et al. |
| 2022/0317290 A1 | 10/2022 | Kostanic et al. |
| 2022/0334211 A1 | 10/2022 | Loren et al. |
| 2022/0342027 A1 | 10/2022 | Loren et al. |
| 2022/0360320 A1 | 11/2022 | Miao et al. |
| 2022/0365165 A1 | 11/2022 | Kirchner et al. |
| 2022/0368410 A1 | 11/2022 | Ma et al. |
| 2022/0413118 A1 | 12/2022 | Starr et al. |
| 2023/0033690 A1 | 2/2023 | Factor et al. |
| 2023/0057666 A1 | 2/2023 | Kwon et al. |
| 2023/0081728 A1 | 3/2023 | Kwon et al. |
| 2023/0111316 A1 | 4/2023 | Ma et al. |
| 2023/0118153 A1 | 4/2023 | Amorim et al. |
| 2023/0133633 A1 | 5/2023 | Park et al. |
| 2023/0135149 A1 | 5/2023 | Krishnamurthy et al. |
| 2023/0379007 A1 | 11/2023 | Kwon et al. |

FOREIGN PATENT DOCUMENTS

| | | |
|---|---|---|
| CN | 101330448 B | 12/2010 |
| CN | 101465793 B | 2/2011 |
| CN | 202257277 U | 5/2012 |
| CN | 101686179 B | 1/2013 |
| CN | 103067286 B | 6/2016 |
| CN | 107645417 A | 1/2018 |
| CN | 110234147 A | 9/2019 |
| CN | 115085799 A | 9/2022 |
| CN | 115688598 A | 2/2023 |
| DE | 102010010935 A1 | 9/2011 |
| EP | 0908022 A2 | 4/1999 |
| EP | 1912392 A2 | 4/2008 |
| EP | 2208084 A4 | 11/2011 |
| EP | 2743726 A1 | 6/2014 |
| EP | 2466964 B1 | 12/2017 |
| EP | 3026961 B1 | 8/2020 |
| GB | 2441610 B | 12/2011 |
| GB | 2542491 A | 3/2017 |
| GB | 2568122 B | 11/2019 |
| GB | 2598610 A | 3/2022 |
| JP | 4290684 B2 | 7/2009 |
| JP | 5164157 B2 | 3/2013 |
| KR | 1020040107702 A | 12/2004 |
| KR | 100568976 B1 | 4/2006 |
| KR | 1020060078814 A | 7/2006 |
| KR | 101231707 B1 | 2/2013 |
| KR | 1020160071964 A | 6/2016 |
| RU | 2718131 C1 | 3/2020 |
| WO | 2008157609 A3 | 3/2009 |
| WO | 2012062091 A1 | 5/2012 |
| WO | 2012165938 A1 | 12/2012 |
| WO | 2015114077 A1 | 8/2015 |
| WO | 2015143604 A1 | 10/2015 |
| WO | 2017101575 A1 | 6/2017 |
| WO | 2018077864 A1 | 5/2018 |
| WO | 2019045767 A1 | 3/2019 |
| WO | 2020117427 A1 | 6/2020 |
| WO | 2020165627 A1 | 8/2020 |
| WO | 2020220233 A1 | 11/2020 |
| WO | 2021251902 A1 | 12/2021 |
| WO | 2022003386 A1 | 1/2022 |
| WO | 2022202858 A1 | 9/2022 |
| WO | 2022221429 A1 | 10/2022 |
| WO | 2022232336 A1 | 11/2022 |
| WO | 2022233042 A1 | 11/2022 |
| WO | 2022233314 A1 | 11/2022 |
| WO | 2023001520 A1 | 1/2023 |
| WO | 2023030622 A1 | 3/2023 |
| WO | 2023031904 A1 | 3/2023 |
| WO | 2023034336 A1 | 3/2023 |
| WO | 2023057655 A1 | 4/2023 |
| WO | 2023067552 A1 | 4/2023 |
| WO | 2023068990 A1 | 4/2023 |
| WO | 2023081918 A1 | 5/2023 |

OTHER PUBLICATIONS

U.S. Appl. No. 17/408,156, filed Aug. 20, 2021, Tj T. Kwon.
U.S. Appl. No. 17/534,061, filed Nov. 23, 2021, William B. Sorsby.
U.S. Appl. No. 17/857,920, filed Jul. 5, 2022, Eric J. Loren.
U.S. Appl. No. 63/344,445, filed May 20, 2022, Eric J. Loren.
U.S. Appl. No. 16/369,398, filed Mar. 29, 2019, Kwon.
U.S. Appl. No. 16/987,671, filed Aug. 7, 2021, Kwon et al.
U.S. Appl. No. 17/233,107, filed Apr. 16, 2022, Loren et al.
U.S. Appl. No. 17/541,703, filed Dec. 3, 2021, Kwon et al.
U.S. Appl. No. 17/857,920, filed Jul. 5, 2022, Loren et al.

(56) References Cited

OTHER PUBLICATIONS

DSSS in a Nutshell, Basics of Design, Research & Design Hub, Sep. 14, 2020.
Extended Search Report for European Application No. 21188737.7 dated Dec. 10, 2021, 8 pages.
Extended Search Report in European Application No. 21190368.7 dated Jan. 5, 2022, 10 pages.
Kwon et al., "Efficient Flooding with Passive Clustering (PC) in Ad Hoc Networks", Computer Communication Review. 32. 44-56. 10.1145/510726.510730, Aug. 11, 2003, 13 pages.
Martorella, M. et al., Ground Moving Target Imaging via SDAP-ISAR Processing: Review and New Trends. Sensors 2021, 21, 2391. https://doi.org/10.3390/s21072391.
Peng Wang, et al., "Convergence of Satellite and Terrestrial Networks: A Comprehensive Survey networks" IEEEAcess; vol. 4, Dec. 31, 2019.
Pulak K. Chowdhury, et al. "Handover Schemes in Satellite Networks: State-of-the-Art and Future Research Directions" 4th Quarter 2006, vol. 8, No. 4, Oct. 1, 2006.
Seddigh et al., "Dominating sets and neighbor elimination-based broadcasting algorithms in wireless networks", IEE Transactions in Parallel and Distributed Systems, IEEE, USA, vol. 13, No. 1, Jan. 1, 2002 (Jan. 1, 2002), pp. 14-25, XP011094090, ISSN: 1045-9219, DOI 10.1109/71.9800214.
Yi et al., "Passive Clustering in Ad Hoc Networks (PC)", URL: https://tools.ietf,org/html/drafts-yi-manet-pc-00, Nov. 14, 2001, 31 pages.
Seddigh M et al: "Dominating sets and neighbor elimination-based broadcasting algorithms in wireless networks", vol. 13, No. 1, Jan. 1, 2002, pp. 14-25.
Turgut D et al: "Optimizing clustering algorithm in mobile ad hoc networks using simulated annealing", vol. 3, Mar. 16, 20023, pp. 1492-1497.

700

702 — PROVIDING A TRANSMITTER NODE AND A RECEIVER NODE, WHEREIN EACH NODE OF THE TRANSMITTER NODE AND THE RECEIVER NODE ARE TIME SYNCHRONIZED, WHEREIN EACH NODE OF THE TRANSMITTER NODE AND THE RECEIVER NODE ARE IN MOTION, WHEREIN EACH NODE OF THE TRANSMITTER NODE AND THE RECEIVER NODE COMPRISES A COMMUNICATIONS INTERFACE INCLUDING AT LEAST ONE ANTENNA ELEMENT, WHEREIN EACH NODE OF THE TRANSMITTER NODE AND THE RECEIVER NODE FURTHER COMPRISES A CONTROLLER OPERATIVELY COUPLED TO THE COMMUNICATIONS INTERFACE, THE CONTROLLER INCLUDING ONE OR MORE PROCESSORS, WHEREIN THE CONTROLLER HAS INFORMATION OF OWN NODE VELOCITY AND OWN NODE ORIENTATION

704 — BASED AT LEAST ON THE TIME SYNCHRONIZATION, APPLYING, BY THE TRANSMITTER NODE, DOPPLER CORRECTIONS TO THE TRANSMITTER NODE'S OWN MOTIONS RELATIVE TO A COMMON REFERENCE FRAME

706 — BASED AT LEAST ON THE TIME SYNCHRONIZATION, APPLYING, BY THE RECEIVER NODE, DOPPLER CORRECTIONS TO THE RECEIVER NODE'S OWN MOTIONS RELATIVE TO THE COMMON REFERENCE FRAME, WHEREIN THE COMMON REFERENCE FRAME IS KNOWN TO THE TRANSMITTER NODE AND THE RECEIVER NODE PRIOR TO THE TRANSMITTER NODE TRANSMITTING SIGNALS TO THE RECEIVER NODE AND PRIOR TO THE RECEIVER NODE RECEIVING THE SIGNALS FROM THE TRANSMITTER NODE

FIG.7

DOPPLER NULLING SCANNING (DNS) SECURITY (SPATIAL AWARENESS)

CROSS-REFERENCE TO RELATED APPLICATIONS

The present application is related to and claims priority from the following U.S. Patent Applications:

(a) U.S. patent application Ser. No. 17/233,107, filed Apr. 16, 2021, which is incorporated by reference in its entirety;

(b) PCT Patent Application No. PCT/US22/24653, filed Apr. 13, 2022, which claims priority to U.S. patent application Ser. No. 17/233,107, filed Apr. 16, 2021, all of which are incorporated by reference in its entirety;

(c) U.S. patent application Ser. No. 17/408,156, filed Aug. 20, 2021, which claims priority to U.S. patent application Ser. No. 17/233,107, filed Apr. 16, 2021, all of which are incorporated by reference in its entirety;

(d) U.S. patent application Ser. No. 17/541,703, filed Dec. 3, 2021, which is incorporated by reference in its entirety, which claims priority to:

U.S. patent application Ser. No. 17/408,156, filed Aug. 20, 2021, which is incorporated by reference in its entirety; and U.S. patent application Ser. No. 17/233,107, filed Apr. 16, 2021, all of which is incorporated by reference in its entirety;

(e) U.S. patent application Ser. No. 17/534,061, filed Nov. 23, 2021, which is incorporated by reference in its entirety;

(f) U.S. Patent Application No. 63/344,445, filed May 20, 2022, which is incorporated by reference in its entirety;

(g) U.S. patent application Ser. No. 17/857,920, filed Jul. 5, 2022, which is incorporated by reference in its entirety;

(h) U.S. Patent Application No. 63/400,138, filed Aug. 23, 2022, which is incorporated by reference in its entirety;

(i) U.S. patent application Ser. No. 17/940,898, filed Sep. 8, 2022, which is incorporated by reference in its entirety;

(j) U.S. patent application Ser. No. 17/941,907, filed Sep. 9, 2022, which is incorporated by reference in its entirety;

(k) U.S. patent application Ser. No. 17/957,881, filed Sep. 30, 2022, which is incorporated by reference in its entirety;

(l) U.S. patent application Ser. No. 17/990,491, filed Nov. 18, 2022, which is incorporated by reference in its entirety;

(m) U.S. patent application Ser. No. 18/130,285, filed Apr. 3, 2023, which is herein incorporated by reference in its entirety;

(n) U.S. patent application Ser. No. 18/134,950, filed Apr. 14, 2023, which is incorporated by reference in its entirety;

(o) U.S. patent application Ser. No. 18/196,807, filed May 12, 2023, which is incorporated by reference in its entirety;

(p) U.S. patent application Ser. No. 18/196,912, filed May 12, 2023, which is incorporated by reference in its entirety;

(q) U.S. patent application Ser. No. 18/196,931, filed May 12, 2023, which is incorporated by reference in its entirety;

(r) U.S. patent application Ser. No. 18/196,765, filed May 12, 2023, which is incorporated by reference in its entirety;

(s) U.S. patent application Ser. No. 18/196,944, filed May 12, 2023, which is incorporated by reference in its entirety;

(t) U.S. patent application Ser. No. 18/196,786, filed May 12, 2023, which is incorporated by reference in its entirety;

(u) U.S. patent application Ser. No. 18/196,936, filed May 12, 2023, which is incorporated by reference in its entirety;

(v) U.S. patent application Ser. No. 18/198,025, filed May 16, 2023, which is incorporated by reference in its entirety;

(w) U.S. patent application Ser. No. 18/198,152, filed May 16, 2023, which is incorporated by reference in its entirety; and (x) U.S. patent application Ser. No. 18/198,671, filed May 17, 2023, which is incorporated by reference in its entirety.

BACKGROUND

Security of communications is paramount in many applications. Security may include confidentiality, integrity, availability, authenticity, and non-repudiation.

Safeguarding confidentiality is vital to avoid unauthorized exposure of sensitive data. This necessitates securing information throughout its storage, transfer, and application. Commonly employed methods for preserving confidentiality include encryption, access management, and data masking. Ensuring integrity is imperative for confirming that data remains unaltered and free from unauthorized changes. This encompasses protecting information from unsanctioned modifications, erasures, or insertions. Techniques such as digital signatures, message authentication codes, and data hashing are routinely used to maintain integrity. Providing availability is key for granting authorized users prompt access to information and systems. This involves defending against denial-of-service attacks and confirming that systems stay highly accessible and resilient to failures. Standard approaches for upholding availability consist of load balancing, redundancy, and disaster recovery planning. Validating authenticity is required to ascertain that information and communication stem from a reliable source. This entails guarding against impersonation, spoofing, and other forms of identity fraud. Common methods for verifying authenticity include authentication, digital certificates, and biometric identification. Achieving non-repudiation is crucial for preventing parties from renouncing their involvement in sending or receiving messages or transactions. This includes safeguarding against message tampering and replay attacks. Techniques such as digital signatures, message authentication codes, and timestamps are frequently implemented to ensure non-repudiation.

Consequently, there is a need for a system and method that can address these issues and provide security of signals.

SUMMARY

A system is disclosed in accordance with one or more illustrative embodiments of the present disclosure. In one illustrative embodiment, the system may include a receiver or transmitter node. In another illustrative embodiment, the receiver or transmitter node may include a communications interface with an antenna element and a controller. In another illustrative embodiment, the controller may include one or more processors and have information of own node velocity and own node orientation relative to a common reference frame. In another illustrative embodiment, the receiver or transmitter node may be time synchronized to apply Doppler corrections to signals, the Doppler corrections associated with the receiver or transmitter node's own motions relative to the common reference frame, the Doppler corrections applied using Doppler null steering along Null directions based on a protocol. In another illustrative embodiment, the receiver node is configured to determine a relative position of the transmitter node based on the signals based on Doppler null steering based on the protocol. In another illustrative embodiment, the protocol comprises a protocol modulation.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

FIG. 7 is a flow diagram illustrating a method according to example embodiments of this disclosure.

DETAILED DESCRIPTION

Figure 1:
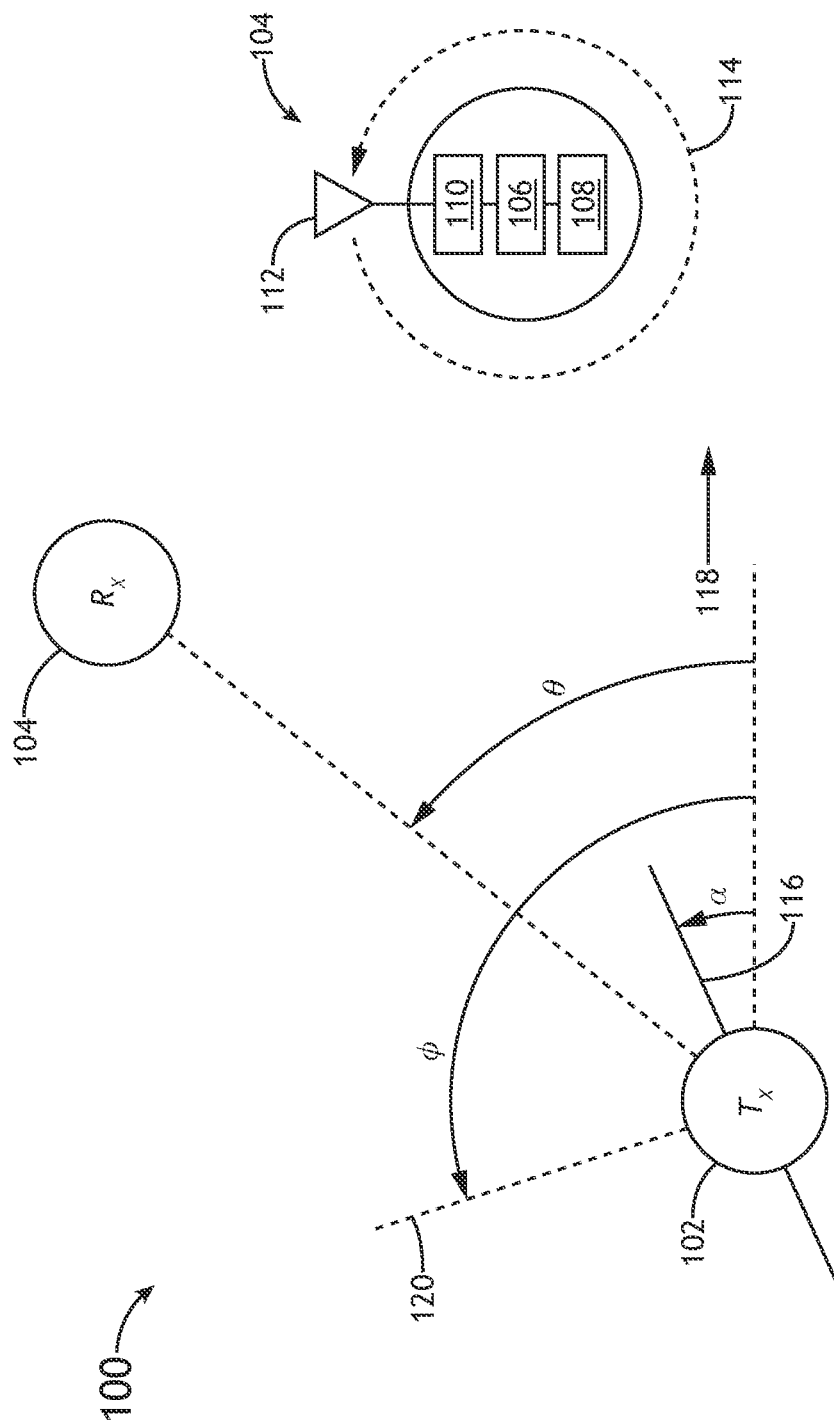
FIG. 1 is a diagrammatic illustration of two nodes in a simplified network and individual nodes thereof according to example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment", "in embodiments" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, embodiments herein are directed to systems and methods for providing security of signals based on Doppler null scanning, such as by using pseudo-random protocol modulations, which may include, but are not necessarily limited to, pseudo random frequency, time of arrival, amplitude, scanning patterns, noise injections, and/or the like.

As described in U.S. patent application Ser. No. 18/130,285, filed Apr. 3, 2023, which is herein incorporated by reference in its entirety, embodiments may utilize time synchronized scanning sequences (along with directionality) to improve metrics such as signal-to-noise ratio, signal acquisition time, speed of attaining situational awareness of attributes of surrounding nodes, range, and the like. In some embodiments, a zero value or near zero value (e.g., or the like such as a zero crossing) of a calculated net frequency shift of a received signal is used to determine a bearing angle between the source (e.g., Tx node) and the receiving node using a time-of-arrival of the received signal.

It is noted that U.S. patent application Ser. No. 17/857,920, filed Jul. 5, 2022, is at least partially reproduced by at least some (or all) of the illustrations of FIGS. 1-7 and at least some (or all) of the corresponding language for FIGS. 1-7 below. For example, at least some examples of doppler nulling methods and systems may be better understood, in a nonlimiting manner, by reference to FIGS. 1-7. Such embodiments and examples are provided for illustrative purposes and are not to be construed as necessarily limiting. For instance, in embodiments the transmitter node may be stationary rather than moving and/or vice versa.

Moreover, and stated for purposes of navigating the disclosure only and not to be construed as limiting, descriptions that may relate to other language not necessarily reproduced from U.S. patent application Ser. No. 17/857,920 include the discussion and figures after FIGS. 1-7.

Referring now to FIGS. 1-7, in some embodiments, a stationary receiver may determine a cooperative transmitter's direction and velocity vector by using a Doppler null scanning approach in two dimensions. A benefit of the approach is the spatial awareness without exchanging explicit positional information. Other benefits include discovery, synchronization, and Doppler corrections which are important for communications. Some embodiment may combine coordinated transmitter frequency shifts along with the transmitter's motion induced Doppler frequency shift to produce unique net frequency shift signal characteristics resolvable using a stationary receiver to achieve spatial awareness. Further, some embodiment may include a three-dimensional (3D) approach with the receiver and the transmitter in motion.

Some embodiments may use analysis performed in a common reference frame (e.g., a common inertial reference frame, such as the Earth, which may ignore the curvature of Earth), and it is assumed that the communications system for each of the transmitter and receiver is informed by the platform of its own velocity and orientation. The approach described herein can be used for discovery and tracking, but the discussion here focuses on discovery which is often the most challenging aspect.

The meaning of the 'Doppler Null' can be explained in part through a review of the two-dimensional (2D) case without the receiver motion, and then may be expounded on by a review of adding the receiver motion to the 2D case, and then including receiver motion in the 3D case.

The Doppler frequency shift of a communications signal is proportional to the radial velocity between transmitter and receiver, and any significant Doppler shift is typically a hindrance that should be considered by system designers. In contrast, some embodiments utilize the Doppler effect to discriminate between directions with the resolution dictated by selected design parameters. Furthermore, such embodiments use the profile of the net frequency shift as the predetermined 'Null' direction scans through the angle space. The resultant profile is sinusoidal with an amplitude that provides the transmitter's speed, a zero net frequency shift when the 'Null' direction aligns with the receiver, and a minimum indicating the direction of the transmitter's velocity. It should be noted that that the transmitter cannot correct for Doppler in all directions at one time so signal characteristics are different in each direction and are different for different transmitter velocities as well. It is exactly these characteristics that the receiver uses to determine spatial awareness. The received signal has temporal spatial characteristics that can be mapped to the transmitter's direction and velocity. This approach utilizes the concept of a 'Null' which is simply the direction where the transmitter perfectly corrects for its own Doppler shift. The same 'Nulling' protocol runs on each node and scans through all directions, such as via a scanning sequence of a protocol. Here we arbitrarily illustrate the scanning with discrete successive steps of 10 degrees but in a real system; however, it should be understood that any suitable step size of degrees may be used for Doppler null scanning.

As already mentioned, one of the contributions of some embodiments is passive spatial awareness. Traditionally, spatial information for neighbor nodes (based on a global positioning system (GPS) and/or gyros and accelerometers) can be learned via data communication. Unfortunately, spatial awareness via data communication, referred to as active spatial awareness is possible only after communication has already been established, not while discovering those neighbor nodes. Data communication is only possible after the signals for neighbor nodes have been discovered, synchronized and Doppler corrected. In contrast, in some embodiments, the passive spatial awareness described herein may be performed using only synchronization bits associated with acquisition. This process can be viewed as physical layer overhead and typically requires much lower bandwidth compared to explicit data transfers. The physical layer overheads for discovery, synchronization and Doppler correction have never been utilized for topology learning for upper layers previously.

Traditionally, network topology is harvested via a series of data packet exchanges (e.g., hello messaging and link status advertisements). The passive spatial awareness may eliminate hello messaging completely and provide a wider local topology which is beyond the coverage of hello messaging. By utilizing passive spatial awareness, highly efficient mobile networking is possible. Embodiments may improve the functioning of a network, itself.

Referring to FIG. 1, a multi-node communications network 100 is disclosed. The multi-node communications network 100 may include multiple communications nodes, e.g., a transmitter (Tx) node 102 and a receiver (Rx) node 104.

In embodiments, the multi-node communications network 100 may include any multi-node communications network known in the art. For example, the multi-node communications network 100 may include a mobile network in which the Tx and Rx nodes 102, 104 (as well as every other communications node within the multi-node communications network) is able to move freely and independently. Similarly, the Tx and Rx nodes 102, 104 may include any communications node known in the art which may be communicatively coupled. In this regard, the Tx and Rx nodes 102, 104 may include any communications node known in the art for transmitting/transceiving data packets. For example, the Tx and Rx nodes 102, 104 may include, but are not limited to, radios (such as on a vehicle or on a person), mobile phones, smart phones, tablets, smart watches, laptops, and the like. In embodiments, the Rx node 104 of the multi-node communications network 100 may each include, but are not limited to, a respective controller 106 (e.g., control processor), memory 108, communication interface 110, and antenna elements 112. (In embodiments, all attributes, capabilities, etc. of the Rx node 104 described below may similarly apply to the Tx node 102, and to any other communication node of the multi-node communication network 100.)

In embodiments, the controller 106 provides processing functionality for at least the Rx node 104 and can include any number of processors, micro-controllers, circuitry, field programmable gate array (FPGA) or other processing systems, and resident or external memory for storing data, executable code, and other information accessed or generated by the Rx node 104. The controller 106 can execute one or more software programs embodied in a non-transitory computer readable medium (e.g., memory 108) that implement techniques described herein. The controller 106 is not limited by the materials from which it is formed or the processing mechanisms employed therein and, as such, can be implemented via semiconductor(s) and/or transistors (e.g., using electronic integrated circuit (IC) components), and so forth.

In embodiments, the memory 108 can be an example of tangible, computer-readable storage medium that provides storage functionality to store various data and/or program code associated with operation of the Rx node 104 and/or controller 106, such as software programs and/or code segments, or other data to instruct the controller 106, and possibly other components of the Rx node 104, to perform the functionality described herein. Thus, the memory 108 can store data, such as a program of instructions for operating the Rx node 104, including its components (e.g., controller 106, communication interface 110, antenna elements 112, etc.), and so forth. It should be noted that while a single memory 108 is described, a wide variety of types and combinations of memory (e.g., tangible, non-transitory memory) can be employed. The memory 108 can be integral with the controller 106, can comprise stand-alone memory, or can be a combination of both. Some examples of the memory 108 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

In embodiments, the communication interface 110 can be operatively configured to communicate with components of the Rx node 104. For example, the communication interface 110 can be configured to retrieve data from the controller 106 or other devices (e.g., the Tx node 102 and/or other nodes), transmit data for storage in the memory 108, retrieve data from storage in the memory, and so forth. The communication interface 110 can also be communicatively coupled with the controller 106 to facilitate data transfer between components of the Rx node 104 and the controller 106. It should be noted that while the communication interface 110 is described as a component of the Rx node 104, one or more components of the communication interface 110 can be implemented as external components communicatively coupled to the Rx node 104 via a wired and/or wireless connection. The Rx node 104 can also include and/or connect to one or more input/output (I/O) devices. In embodiments, the communication interface 110 includes or is coupled to a transmitter, receiver, transceiver, physical connection interface, or any combination thereof.

It is contemplated herein that the communication interface 110 of the Rx node 104 may be configured to communicatively couple to additional communication interfaces 110 of additional communications nodes (e.g., the Tx node 102) of the multi-node communications network 100 using any wireless communication techniques known in the art including, but not limited to, GSM, GPRS, CDMA, EV-DO, EDGE, WiMAX, 3G, 4G, 4G LTE, 5G, WiFi protocols, RF, LoRa, and the like.

In embodiments, the antenna elements 112 may include directional or omnidirectional antenna elements capable of being steered or otherwise directed (e.g., via the communications interface 110) for spatial scanning in a full 360-degree arc (114) relative to the Rx node 104 (or even less than a full 360 degree arc).

In embodiments, the Tx node 102 and Rx node 104 may one or both be moving in an arbitrary direction at an arbitrary speed, and may similarly be moving relative to each other. For example, the Tx node 102 may be moving relative to the Rx node 104 according to a velocity vector 116, at a relative velocity $V_{TX}$ and a relative angular direction (an angle $\alpha$ relative to an arbitrary direction 118 (e.g., due east); $\theta$ may be the angular direction of the Rx node relative to due east.

In embodiments, the Tx node 102 may implement a Doppler nulling protocol. For example, the Tx node 102 may adjust its transmit frequency to counter the Doppler frequency offset such that there is no net frequency offset (e.g., "Doppler null") in a Doppler nulling direction 120 (e.g., at an angle $\phi$ relative to the arbitrary direction 118). The transmitting waveform (e.g., the communications interface 110 of the Tx node 102) may be informed by the platform (e.g., the controller 106) of its velocity vector and orientation (e.g., $\alpha$, $V_T$) and may adjust its transmitting frequency to remove the Doppler frequency shift at each Doppler nulling direction 120 and angle $\phi$.

To illustrate aspects of some embodiments, we show the 2D dependence of the net frequency shift for a stationary receiver as a function of Null direction across the horizon, as shown in a top-down view of FIG. 1, where the receiver node 104 is stationary and positioned $\theta$ from east relative to the transmitter, the transmitter node 102 is moving with a speed $|\vec{V_T}|$ and direction a from east and a snapshot of the scanning $\phi$ which is the 'Null' direction, exemplarily shown as 100 degrees in this picture.

The Doppler shift is a physical phenomenon due to motion and can be considered as a channel effect. In this example the transmitter node 102 is the only moving object, so it is the only source of Doppler shift. The Doppler frequency shift as seen by the receiver node 104 due to the transmitter node 102 motion is:

$$\frac{\Delta f_{DOPPLER}}{f} = \frac{|\vec{V_T}|}{c}\cos(\theta - \alpha),$$

where c is the speed of light

The other factor is the transmitter frequency adjustment term that should exactly compensate the Doppler shift when the 'Null' direction aligns with the receiver direction. It is the job of the transmitter node 102 to adjust its transmit frequency according to its own speed ($|\vec{V_T}|$), and velocity direction ($\alpha$). That transmitter frequency adjustment ($\Delta f_T$) is proportional to the velocity projection onto the 'Null' direction ($\phi$) and is:

$$\frac{\Delta f_T}{f} = -\frac{|\vec{V_T}|}{c}\cos(\varphi - \alpha)$$

The net frequency shift seen by the receiver is the sum of the two terms:

$$\frac{\Delta f_{net}}{f} = \frac{|\vec{V_T}|}{c}[\cos(\theta - \alpha) - \cos(\varphi - \alpha)]$$

It is assumed that the velocity vector and the direction changes slowly compared to the periodic measurement of $\Delta f_{net}$. Under those conditions, the unknown parameters (from the perspective of the receiver node 104) of $\alpha$, $|\vec{V_T}|$, and $\theta$ are constants.

Furthermore, it is assumed that the receiver node 104 has an implementation that resolves the frequency of the incoming signal, as would be understood to one of ordinary skill in the art.

Figure 2A:
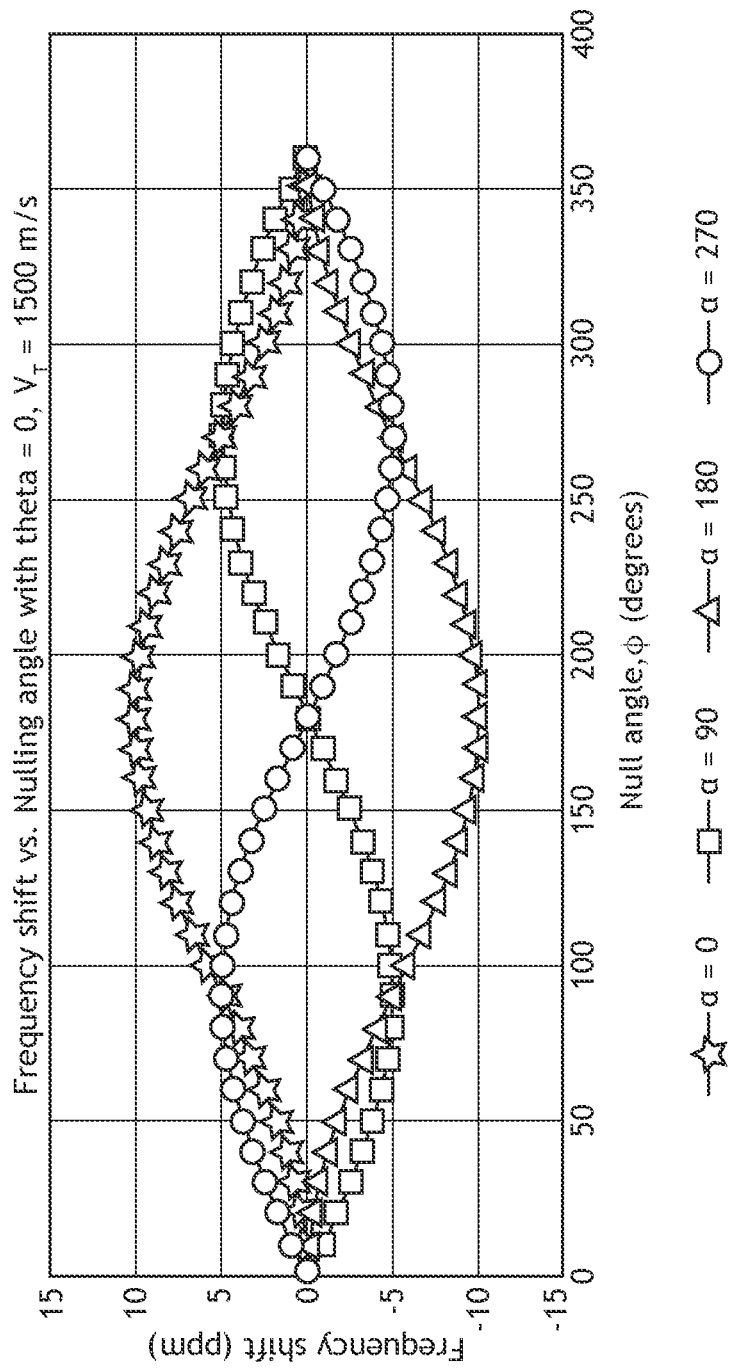
FIG. 2A is a graphical representation of frequency shift profiles within the network of FIG. 1.
Figure 2B:
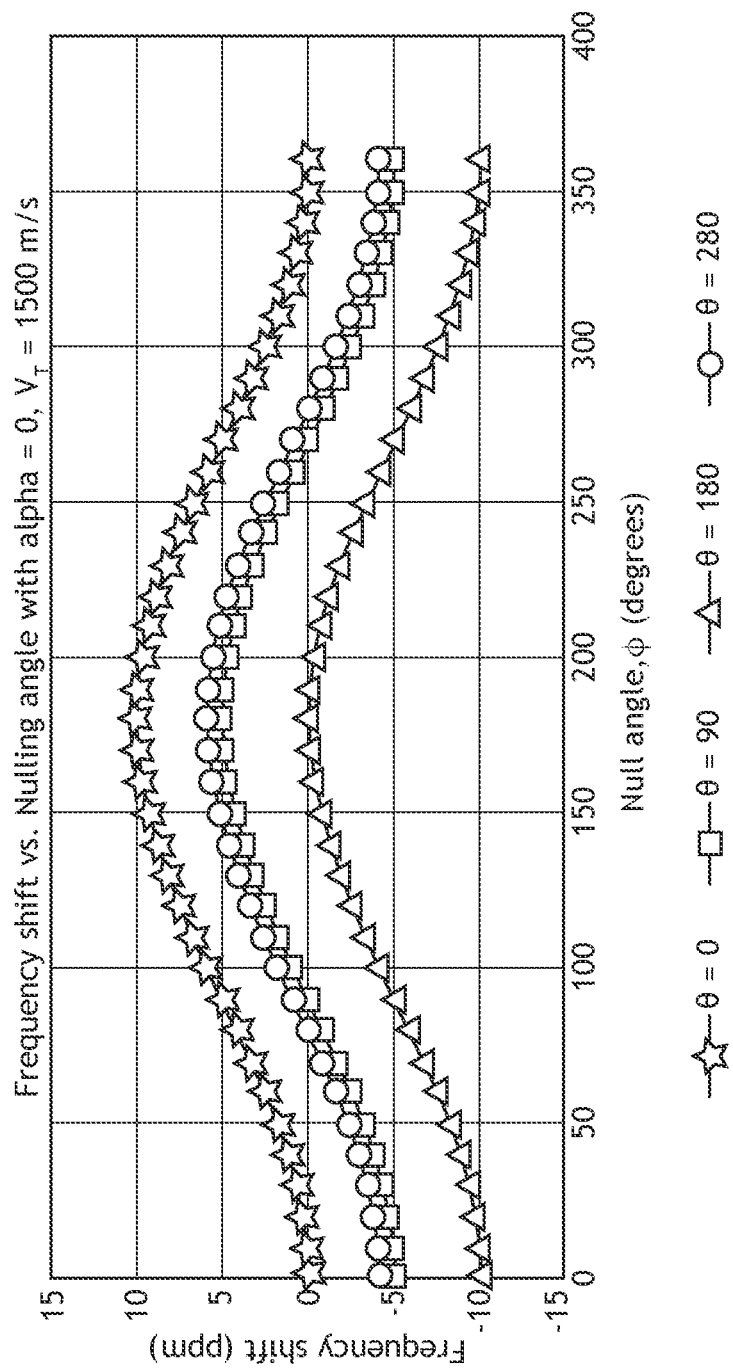
FIG. 2B is a graphical representation of frequency shift profiles within the network of FIG. 1.

FIG. 2A shows the resulting net frequency shift as a function of the 'Null' direction for scenarios where a stationary receiver is East of the transmitter (theta=0), and with a transmitter speed of 1500 meters per second (m/s). FIG. 2B shows the results for a stationary receiver and for several directions with an Eastern transmitter node velocity direction (alpha=0). The frequency shifts are in units of parts per million (ppm). As shown in FIGS. 2A and 2B, the amplitude is consistent with the transmitter node's 102 speed of 5 ppm $[|\vec{V_T}|/c*(1\times10^6)]$ regardless of the velocity direction or position, the net frequency shift is zero when the 'Null' angle is in the receiver direction (when $\phi=\theta$), and the minimum occurs when the 'Null' is aligned with the transmitter node's 102 velocity direction (when ϕ=α).

From the profile, the receiver node 104 can therefore determine the transmitter node's 102 speed, the transmitter node's 102 heading, and the direction of the transmitter node 102 is known to at most, one of two locations (since some profiles have two zero crossings). It should be noted that the two curves cross the y axis twice (0 & 180 degrees in FIG. 2A, and ±90 degrees in FIG. 2B) so there is initially an instance of ambiguity in position direction. In this case the receiver node 104 knows the transmitter node 102 is either East or West of the receiver node 104.

Figure 3:
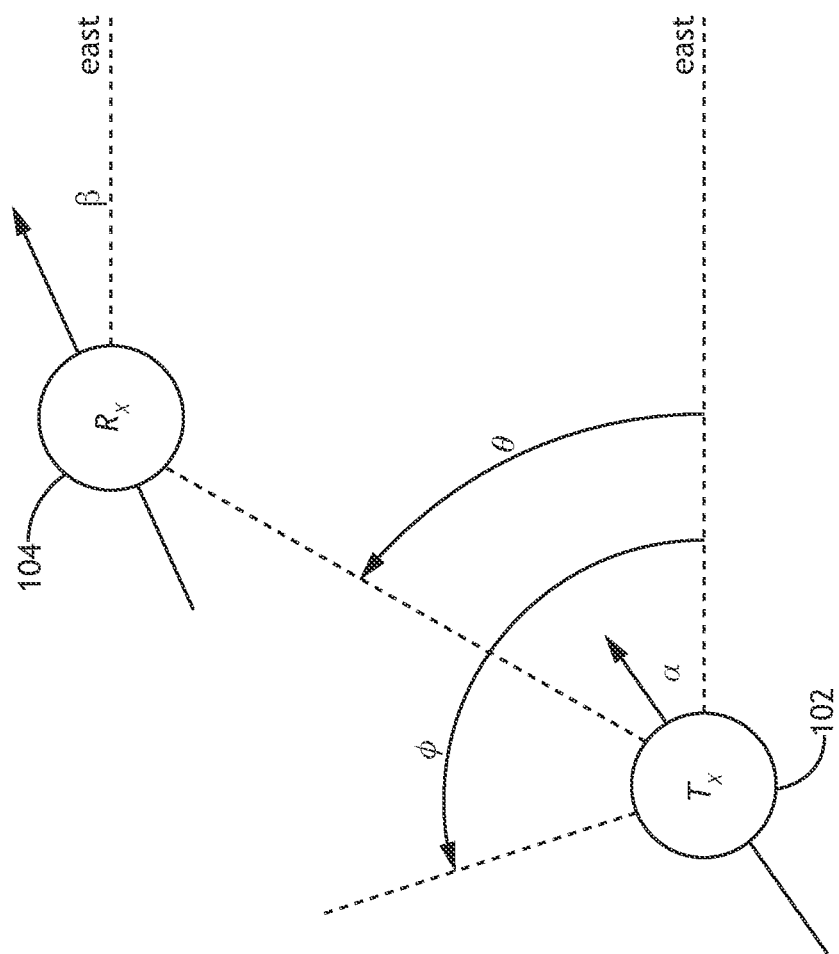
FIG. 3 is a diagrammatic illustration of a transmitter node and a receiver node according to example embodiments of this disclosure.

Referring to FIG. 3, a multi-node communications network 100 is disclosed. The multi-node communications network 100 may include multiple communications nodes, e.g., a transmitter (Tx) node 102 and a receiver (Rx) node 104. As shown in FIG. 3 both of the transmitter node 102 and the receiver node 104 are in motion in two dimensions.

The simultaneous movement scenario is depicted in FIG. 3 where the receiver node 104 is also moving in a generic velocity characterized by a speed $|\vec{V_R}|$ and the direction, β. The protocol for the moving receiver node 104 incorporates a frequency adjustment on the receiver node's 104 side to compensate for the receiver node's 104 motion as well. The equations have two additional terms. One is a Doppler term for the motion of the receiver and the second is frequency compensation by the receiver.

Again, the Doppler shift is a physical phenomenon due to motion and can be considered as a channel effect, but in this case both the transmitter node 102 and the receiver node 104 are moving so there are two Doppler shift terms. The true Doppler shift as seen by the receiver due to the relative radial velocity is:

$$\frac{\Delta f_{DOPPLER}}{f} = \frac{|\vec{V_T}|}{c}\cos(\theta - \alpha) - \frac{|\vec{V_R}|}{c}\cos(\theta - \beta)$$

The other factors are the transmitter node 102 and receiver node 104 frequency adjustment terms that exactly compensates the Doppler shift when the 'Null' direction aligns with the receiver direction. It is the job of the transmitter node 102 to adjust the transmitter node's 102 transmit frequency according to its own speed ($|\vec{V_T}|$), and velocity direction (α). That transmitter node frequency adjustment is proportional to the velocity projection onto the 'Null' direction (ϕ) and is the first term in the equation below.

It is the job of the receiver node 104 to adjust the receiver node frequency according to the receiver node's 104 own speed ($|\vec{V_R}|$), and velocity direction (β). That receiver node frequency adjustment is proportional to the velocity projection onto the 'Null' direction (ϕ) and is the second term in the equation below. The receiver node frequency adjustment can be done to the receive signal prior to the frequency resolving algorithm or could be done within the algorithm.

$$\frac{\Delta f_{T\&R}}{f} = -\frac{|\vec{V_T}|}{c}\cos(\varphi - \alpha) + \frac{|\vec{V_R}|}{c}\cos(\varphi - \beta)$$

The net frequency shift seen by the receiver is the sum of all terms:

$$\frac{\Delta f_{net}}{f} = \frac{|\vec{V_T}|}{c}[\cos(\theta - \alpha) - \cos(\varphi - \alpha)] - \frac{|\vec{V_R}|}{c}[\cos(\theta - \beta) - \cos(\varphi - \beta)]$$

Again, it is assumed that the receiver node 104 has an implementation that resolves the frequency of the incoming signal, as would be understood in the art.

Also, it is assumed that the velocity vector and direction changes slowly compared to the periodic measurement of $\Delta f_{net}$. Again, under such conditions, the unknown parameters (from the perspective of the receiver node 104) α, $|\vec{V_T}|$, and θ are constants. When the velocity vector or direction change faster, then this change could be tracked, for example if the change is due to slow changes in acceleration.

Figure 4A:
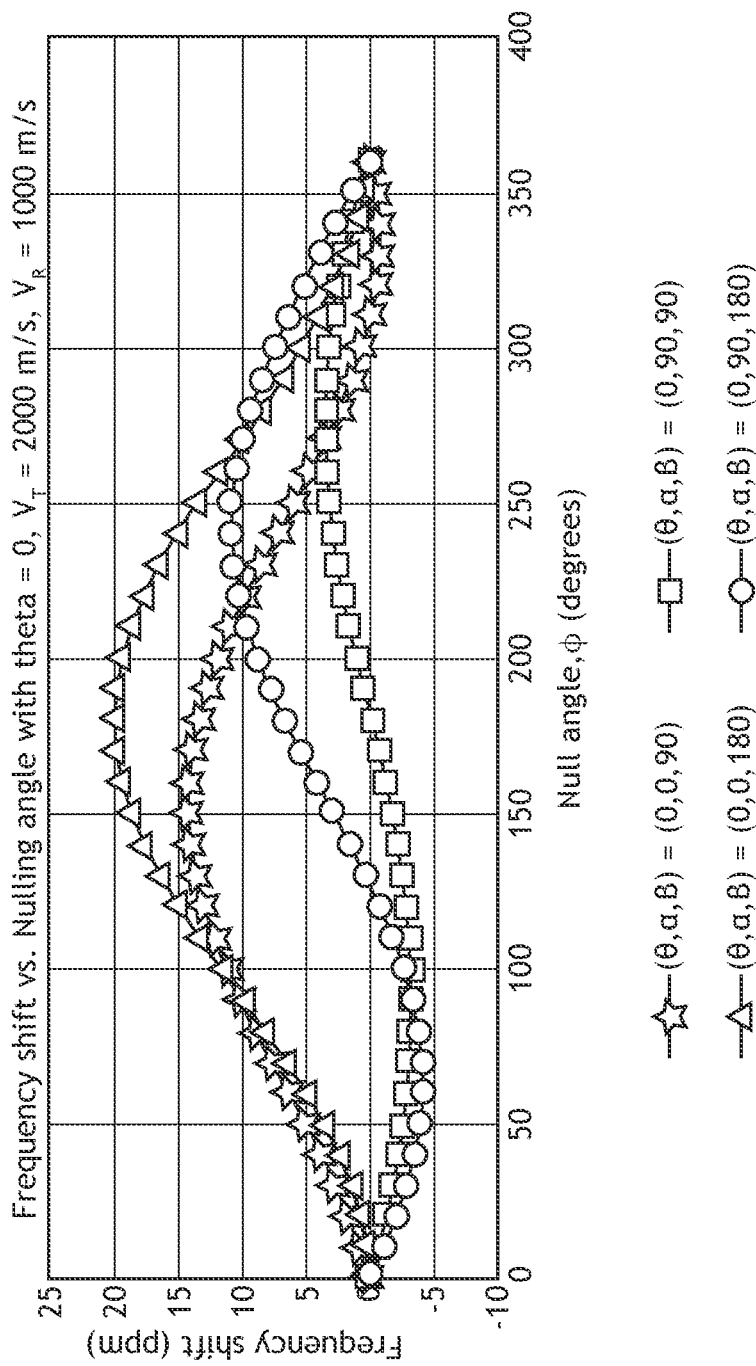
FIG. 4A is a graphical representation of frequency shift profiles within the network of FIG. 3.
Figure 4B:
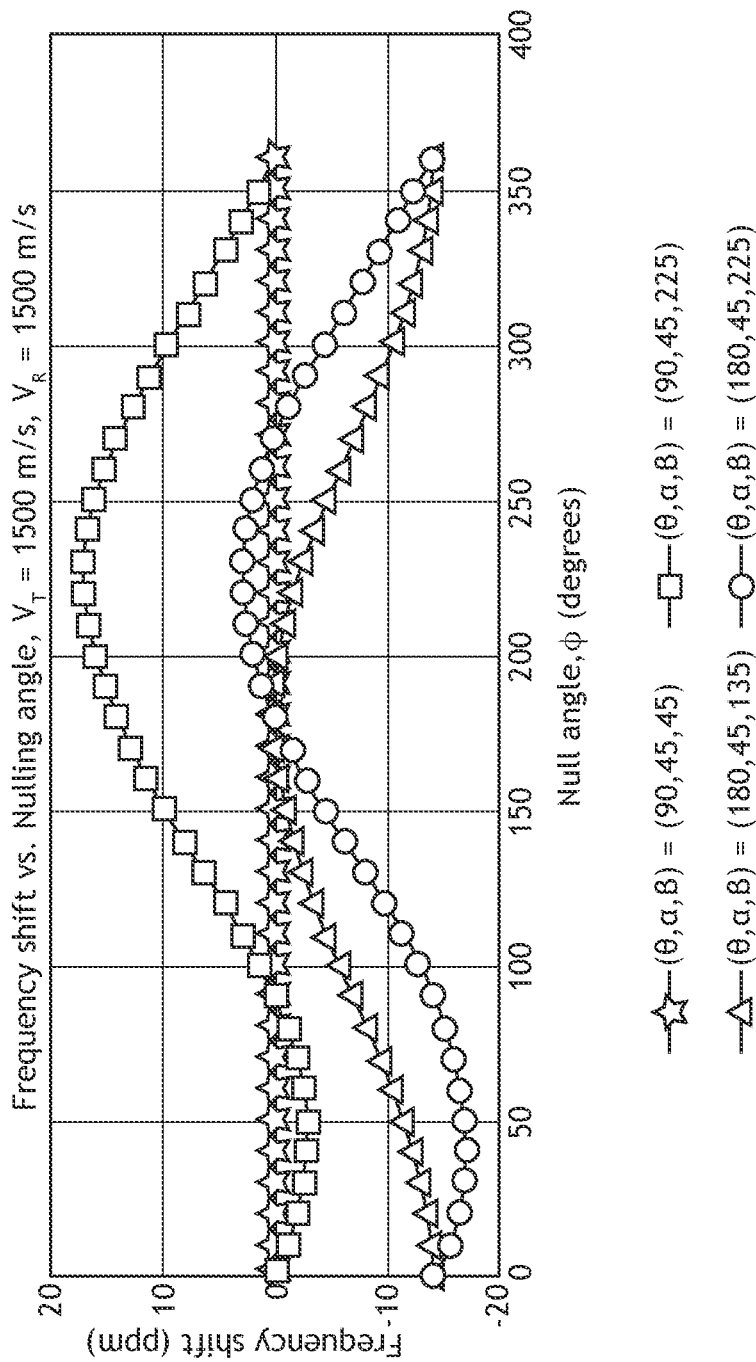
FIG. 4B is a graphical representation of frequency shift profiles within the network of FIG. 3.

The net frequency shift for the two-dimensional (2D) moving receiver node 104 approach is shown in FIGS. 4A and 4B for several scenario cases of receiver node location, θ, and transmitter node and receiver node speeds ($|\vec{V_T}|$ & $|\vec{V_R}|$), as well as transmitter node and receiver node velocity direction (α and β). FIG. 4A has different speeds for the transmitter node 102 and receiver node 104 as well as the receiver node location of θ=0. FIG. 4B has the same speed for the transmitter node and receiver node. Similarly, there are three concepts to notice here:

The amplitude is consistent with the relative velocity between transmitter node 102 and receiver node 104 [|($\vec{V_T}|\cos(\alpha) - |\vec{V_T}|\cos(\beta))/c*(1e6)$].

The net frequency shift is zero when the 'Null' angle is in the receiver direction (when ϕ=8).

The minimum occurs when the 'Null' is aligned with the relative velocity direction (when ϕ=angle|($\vec{V_T}|\cos(\alpha)-|\vec{V_T}|\cos(\beta)$)).

Again, there is an initial dual point ambiguity with the position, θ, but the transmitter node's 102 speed and velocity vector is known.

Figure 5:
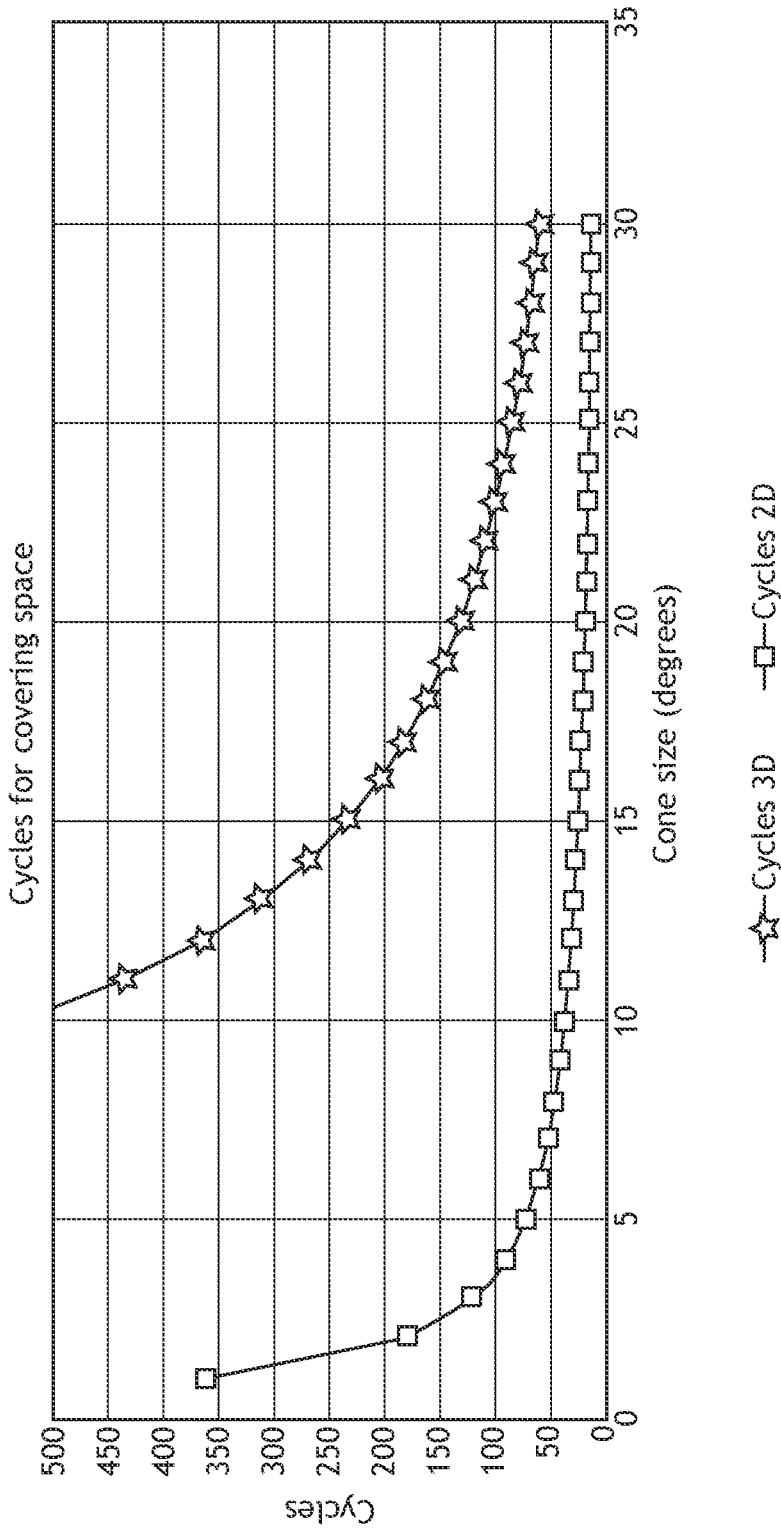
FIG. 5 is a graph of sets for covering space.

Referring now to FIG. 5, while the 2D picture is easier to visualize, the same principles apply to the 3D case. FIG. 5 shows a number of direction sets needed to span 3D and 2D space with different cone sizes (cone sizes are full width). Before diving into the equations, it's worth commenting on the size of the space when including another dimension. For example, when a 'Null' step size of 10 degrees was used in the previous examples, it took 36 sets to span the 360 degrees in 2D. Thus, if an exemplary detection angle of 10 degrees is used (e.g., a directional antenna with 10-degree cone) it would take 36 sets to cover the 2D space. The 3D fractional coverage can be computed by calculating the coverage of a cone compared to the full 4 pi steradians. The fraction is equal to the integral $$FractionCoverage3D = \frac{\int_0^{ConeSize/2} r^2 \sin(\theta t) d\theta t d\varphi}{4\pi r^2} = \frac{1 - \cos(ConeSize/2)}{2}$$

$$FractionCoverage2D = 2\pi/ConeSize$$

The number of sets to span the space is shown in FIG. 5 for both the 2D and 3D cases which correlates with discovery time. Except for narrow cone sizes, the number of sets is not drastically greater for the 3D case (e.g., approximately 15 times at 10 degrees, 7 time at 20 degrees, and around 5 times at 30 degrees). Unless systems are limited to very narrow cone sizes, the discovery time for 3D searches is not overwhelming compared to a 2D search.

Figure 6:
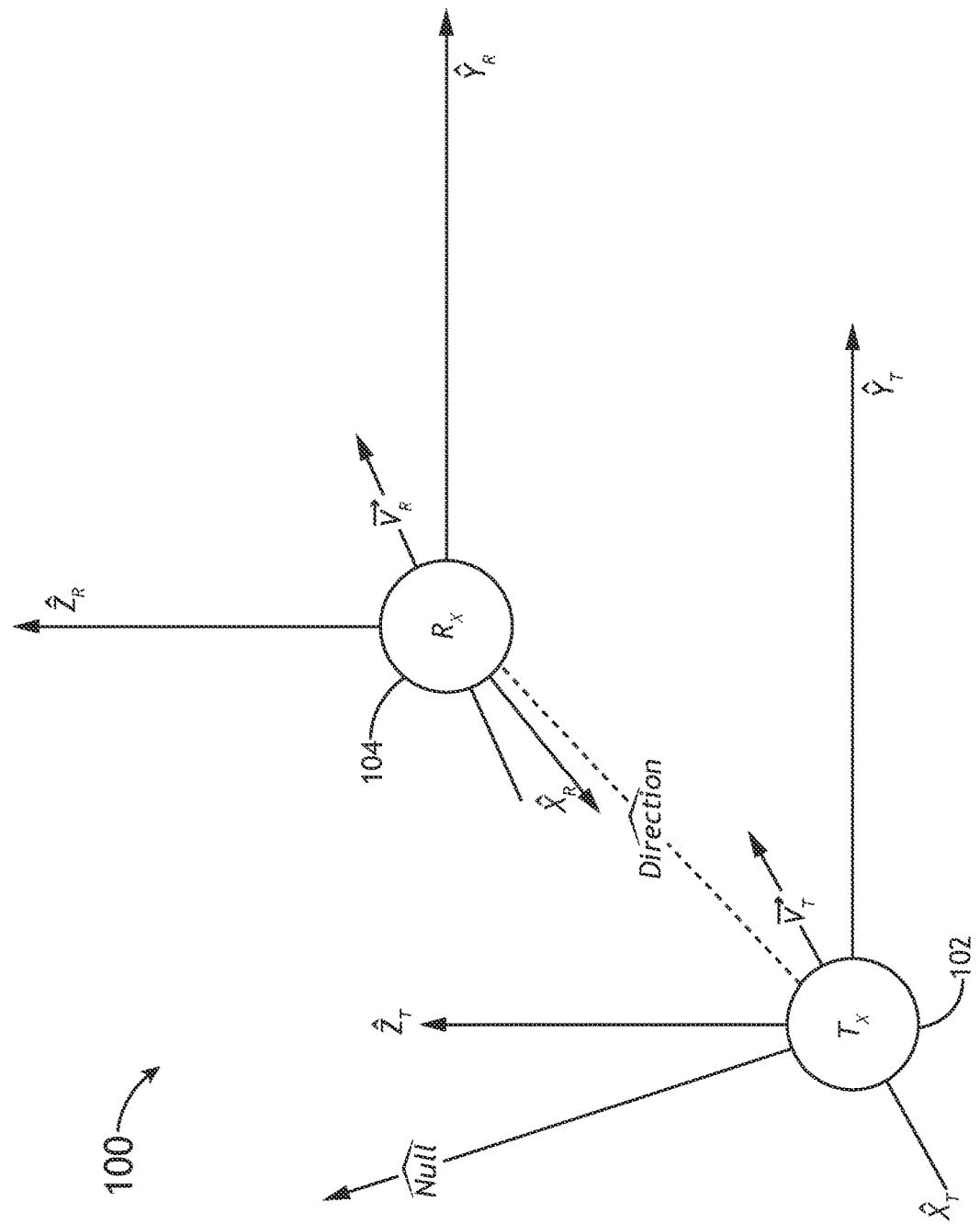
FIG. 6 is a diagrammatic illustration of a transmitter node and a receiver node according to example embodiments of this disclosure.

Referring now to FIG. 6, a multi-node communications network 100 is disclosed. The multi-node communications network 100 may include multiple communications nodes, e.g., a transmitter (Tx) node 102 and a receiver (Rx) node 104. As shown in FIG. 6 both of the transmitter node 102 and the receiver node 104 are in motion in three dimensions.

The 3D approach to Doppler nulling follows the 2D approach but it is illustrated here with angles and computed vectorially for simplicity.

In three dimensions, it is convenient to express the equations in vector form which is valid for 2 or 3 dimensions. FIG. 6 shows the geometry in 3 dimensions where $\widehat{Direction}$ is the unit vector pointing to the receiver from the transmitter, and $\widehat{Null}$ is the unit vector pointing in the 'Null' direction defined by the protocol.

The true Doppler shift as seen by the receiver node 104 due to the relative radial velocity which is the projection onto the $\widehat{Direction}$ vector:

$$\frac{\Delta f_{DOPPLER}}{f} = \frac{1}{c}\vec{V_T} \cdot \widehat{Direction} - \frac{1}{c}\vec{V_R} \cdot \widehat{Direction}$$

The nulling protocol adjusts the transmit node frequency and receiver node frequency due to their velocity projections onto the $\widehat{Null}$ direction $$\frac{\Delta f_T}{f} = -\frac{1}{c}\vec{V_T} \cdot \widehat{Null} + \frac{1}{c}\vec{V_R} \cdot \widehat{Null}$$

The net frequency shift seen by the receiver node 104 is the sum of all terms:

$$\frac{\Delta f_{net}}{f} = \frac{1}{c}\vec{V_T} \cdot \widehat{Direction} - \frac{1}{c}\vec{V_R} \cdot \widehat{Direction} - \frac{1}{c}\vec{V_T} \cdot \widehat{Null} + \frac{1}{c}\vec{V_R} \cdot \widehat{Null}$$

The net frequency shift for the 3D moving receiver node 104 approach is not easy to show pictorially but can be inspected with mathematical equations to arrive at useful conclusions. The first two terms are the Doppler correction (DC) offset and the last two terms are the null dependent terms. Since the $\widehat{Null}$ is the independent variable, the maximum occurs when $(\vec{V_R}-\vec{V_T})$ and $\widehat{Null}$ are parallel and is a minimum when they are antiparallel. Furthermore, the relative speed is determined by the amplitude, $$\text{Amplitude} = \frac{1}{c}|\vec{V_R} - \vec{V_T}|$$

Lastly, the net frequency is zero when the $\widehat{Null}$ is parallel (i.e., parallel in same direction, as opposed to anti-parallel) to $\widehat{Direction}$.

$$\frac{\Delta f_{net}}{f} = 0 \text{ when,}$$

-continued $$\frac{1}{c}\vec{V_T} \cdot \widehat{Direction} - \frac{1}{c}\vec{V_R} \cdot \widehat{Direction} = \frac{1}{c}\vec{V_T} \cdot \widehat{Null} - \frac{1}{c}\vec{V_R} \cdot \widehat{Null} \text{ or,}$$

$$(\vec{V_T} - \vec{V_R}) \cdot \widehat{Direction} = (\vec{V_T} - \vec{V_R}) \cdot \widehat{Null}$$

For the 3D case:

The amplitude is consistent with the relative velocity between transmitter node 102 and receiver node 104 [$|\vec{V_R}|-|\vec{V_T}|/c$].

The net frequency shift is zero when the 'Null' angle is in the receiver node direction, $(|\vec{V_T}|-|\vec{V_R}|) \cdot \widehat{Direction} = ((|\vec{V_T}|-|\vec{V_R}|)\widehat{Null})$.

The minimum occurs when the 'Null' is aligned with the relative velocity direction.

Referring still to FIG. 6, in some embodiments, the system (e.g., the multi-node communications network 100) may include a transmitter node 102 and a receiver node 104. Each node of the transmitter node 102 and the receiver node 104 may include a communications interface 110 including at least one antenna element 112 and a controller operatively coupled to the communications interface, the controller 106 including one or more processors, wherein the controller 106 has information of own node velocity and own node orientation. The transmitter node 102 and the receiver node 104 may be in motion (e.g., in two dimensions or in three dimensions). The transmitter node 102 and the receiver node 104 may be time synchronized to apply Doppler corrections associated with said node's own motions relative to a common reference frame (e.g., a common inertial reference frame (e.g., a common inertial reference frame in motion or a stationary common inertial reference frame)). The common reference frame may be known to the transmitter node 102 and the receiver node 104 prior to the transmitter node 102 transmitting signals to the receiver node 104 and prior to the receiver node 104 receiving the signals from the transmitter node 102. In some embodiments, the system is a mobile network comprising the transmitter node 102 and the receiver node 104.

In some embodiments, the applying of the Doppler corrections associated with the receiver node's own motions relative to the common reference frame is based on a common reference frequency. For example, a common reference frequency may be adjusted by a node's own motions to cancel out those motions in reference to the null angle. This common reference frequency may be known by each node prior to transmission and/or reception of the signals. In some embodiments, calculating the net frequency change seen by the receiver node 104 is based on the common reference frequency. For example, the net frequency change may be a difference between a measured frequency of the signals and the common reference frequency.

For purposes of discussing the receiver node 104, a "source" generally refers to a source of a received signal, multiple sources of multiple signals, a single source of multiple signals, and/or the like. For example, a source may be a transmitter node 102 configured to apply Doppler corrections as disclosed herein and in applications from which priority is claimed and/or incorporated by reference. In this regard, a receiver node 104 may determine one or more attributes of the source (e.g., bearing between the receiver node 104 and the source, bearing of the velocity of the source, amplitude/speed of the velocity, range, and the like). In some embodiments, the receiver node 104 and the source (e.g., transmitter node 102) are configured to use a same, compatible, and/or similar Doppler correction, protocol, common reference frame, common reference frequency, time synchronization, and/or the like such that the receiver node 104 may determine various attributes of the source. Note, in some embodiments, that one or more of these may be known ahead of time, be determined thereafter, included as fixed variable values as part of the protocol, and/or determined dynamically (in real time) as part of the protocol. For example, the protocol may determine that certain common reference frames should be used in certain environments, such as using GPS coordinates on land and a naval ship beacon transmitter common reference frame location (which may be mobile) over certain areas of ocean, which may dynamically change in real time as a location of a node changes.

In some embodiments, the transmitter node 102 and the receiver node 104 are time synchronized via synchronization bits associated with acquisition. For example, the synchronization bits may operate as physical layer overhead.

In some embodiments, the transmitter node 102 is configured to adjust a transmit frequency according to an own speed and an own velocity direction of the transmitter node 102 so as to perform a transmitter-side Doppler correction. In some embodiments, the receiver node 104 is configured to adjust a receiver frequency of the receiver node 104 according to an own speed and an own velocity direction of the receiver node 104 so as to perform a receiver-side Doppler correction. In some embodiments, an amount of adjustment of the adjusted transmit frequency is proportional to a transmitter node 102 velocity projection onto a Doppler null direction, wherein an amount of adjustment of the adjusted receiver frequency is proportional to a receiver node 104 velocity projection onto the Doppler null direction. In some embodiments, the receiver node 104 is configured to determine a relative speed between the transmitter node 102 and the receiver node 104. In some embodiments, the receiver node 104 is configured to determine a direction that the transmitter node 102 is in motion and a velocity vector of the transmitter node 102. In some embodiments, a maximum net frequency shift for a Doppler correction by the receiver node 104 occurs when a resultant vector is parallel to the Doppler null direction, wherein the resultant vector is equal to a velocity vector of the receiver node 104 minus the velocity vector of the transmitter node 102. In some embodiments, a minimum net frequency shift for a Doppler correction by the receiver node 104 occurs when a resultant vector is antiparallel to the Doppler null direction, wherein the resultant vector is equal to a velocity vector of the receiver node 104 minus the velocity vector of the transmitter node 102. In some embodiments, a net frequency shift for a Doppler correction by the receiver node 104 is zero when a vector pointing to the receiver node from the transmitter node 102 is parallel to the Doppler null direction.

Referring now to FIG. 7, an exemplary embodiment of a method 700 according to the inventive concepts disclosed herein may include one or more of the following steps. Additionally, for example, some embodiments may include performing one or more instances of the method 700 iteratively, concurrently, and/or sequentially. Additionally, for example, at least some of the steps of the method 700 may be performed in parallel and/or concurrently. Additionally, in some embodiments, at least some of the steps of the method 700 may be performed non-sequentially.

A step 702 may include providing a transmitter node and a receiver node, wherein each node of the transmitter node and the receiver node are time synchronized, wherein each node of the transmitter node and the receiver node are in motion, wherein each node of the transmitter node and the receiver node comprises a communications interface including at least one antenna element, wherein each node of the transmitter node and the receiver node further comprises a controller operatively coupled to the communications interface, the controller including one or more processors, wherein the controller has information of own node velocity and own node orientation.

A step 704 may include based at least on the time synchronization, applying, by the transmitter node, Doppler corrections to the transmitter node's own motions relative to a common reference frame.

A step 706 may include based at least on the time synchronization, applying, by the receiver node, Doppler corrections to the receiver node's own motions relative to the common reference frame, wherein the common reference frame is known to the transmitter node and the receiver node prior to the transmitter node transmitting signals to the receiver node and prior to the receiver node receiving the signals from the transmitter node.

Further, the method 700 may include any of the operations disclosed throughout.

The null scanning/steering technique discussed herein illustrates a system and a method for spatial awareness from resolving the temporal spatial characteristics of the transmitter node's 102 radiation. This approach informs the receiver node 104 of the relative speed between the transmitter node 102 and receiver node 104 as well as the transmitter node direction and transmitter node velocity vector. This approach includes scanning through all directions and has a high sensitivity (e.g., low net frequency shift) when the null direction is aligned with the transmitter node direction. This approach can be implemented on a highly sensitive acquisition frame which is typically much more sensitive than explicit data transfers which allow for the ultra-sensitive spatial awareness with relatively low power.

This sentence may mark an end to the (at least partially) reproduced language from U.S. patent application Ser. No. 17/857,920 corresponding to the (at least partially) reproduced FIGS. 1-7. However, note that this paragraph is nonlimiting, and changes may have been made and language added or removed, and not all the language above or corresponding figures above are necessarily reproduced from U.S. patent application Ser. No. 17/857,920.

Broadly speaking, embodiments herein are directed to systems and methods for providing security of signals based on Doppler null scanning, such as by using pseudo-random communication protocol modulations, which may include, but are not necessarily limited to, pseudo random frequency, time of arrival, amplitude, scanning patterns, noise injections, and/or the like.

In a broad sense, communication protocols refer to any established set of rules, guidelines, standards, or procedures employed during communication using the protocol. Communication protocols cover an extensive array of protocols that enable data transmission and networking across diverse industries. Examples of such protocols are Link 16 for tactical data exchange, Automatic Dependent Surveillance-Broadcast (ADS-B) for aircraft monitoring, High Frequency (HF) radio for extended-range communication, SATCOM for satellite-enabled communication, VHF/UHF for line-of-sight communication, and IEEE 802.11 for WiFi technology. These protocols strive to ensure secure and dependable data exchange in high-stakes situations. It is contemplated herein that a protocol using Doppler null steering may employ protocol modulations (e.g., signal modulations such as frequency modulations) for increased security of Doppler null steering-based communication methods. Doppler null steering methods herein with enhanced security (i.e., modulated protocols) may be used alone, in combinations with, and/or in lieu of the example protocols given above or any other communication protocol known in the art or otherwise developed.

In this regard, benefits of Doppler null steering such as fast discovery times, long range, robustness to spoofing/noise may be extended to secure communications.

Embodiments herein may use a variety of techniques to improve security concepts such as improving confidentiality, integrity, availability, authenticity, and non-repudiation.

Confidentiality is important to protect sensitive information from being disclosed to unauthorized parties. For Doppler null scanning (DNS), this may include transforming the DNS symbols and protocol so that adversaries that know the DNS design and protocol (and possibly even many of the parameters, such as frequency) can't run the DNS protocol and learn relative positions of the transmitter nodes 102.

Potential transforms for confidentiality include transform of times between pulses, transmit/receiver frequencies, non-periodic/non-constant bandwidth symbols, transform of amplitude, transform of doppler sequence, and transform of times between transmissions of doppler sequences.

In embodiments (e.g., for military systems), this could include transforms that reduce cyclomatic (or periodicity) and energy per symbol per hertz (e.g., so there is low Eb/No at unintended receivers) to provide low probability of detection (LPD) and low probability of interception (LPI).

Integrity is important to ensure that information has not been tampered with or modified in an unauthorized way. This includes protecting data from unauthorized modification, deletion, or addition. For DNS, this may include transformations to protect against interference and jamming (intentional interference) as well as detection of potential spoofing symbols against a subset of receivers. However, a potential spoofer that knows the location of the transmitter and a receiver (or multiple receivers with similar expected doppler from the transmitter) could be spoofed or have some error inducing transmissions by a malicious radio. Potential transforms against interference and jamming include transforms to improve signal to noise (such as spread spectrum or frequency hopping of symbols) and addition of additional RF symbols to detect errors in things like transmitter ID).

Potential transforms against spoofing include transforms so that a malicious transmitter's transmissions don't match the expected transmission. For example, transforms may include transform of times between pulses, transmit/receiver frequencies, non-periodic/non-constant bandwidth symbols, transform of amplitude, transform of doppler sequence, and/or addition of additional RF symbols to identify the transmitter node 102.

Availability is important to ensure that information and systems are accessible to authorized users when they need them. This includes protecting against denial-of-service attacks and ensuring that systems are highly available and can withstand failures. DNS transforms for this case may be similar to transforms described herein for integrity.

Authenticity is important to ensure that information and communication come from a trusted source. This includes protecting against impersonation, spoofing, and other types of identity fraud. Potential transforms for this case include use of pseudo-random sequences to drive the DNS transforms along with exchange of keys or other security certificates to drive the pseudo-random sequences. In embodiments, a correctly matching transform may be configured to authenticate a signal from the transmitter node 102.

In embodiments, utilizing additional RF symbols configured as a transmitter node identification (ID) would also authenticate a node/user. Alternatively, the ID could be used, possibly in combination with keys or other security certificates, so that the specific DNS transform used would indicate the transmitter ID as well as authenticate that transmitter ID.

Non-repudiation is important to ensure that a party cannot deny having sent or received a message or transaction. This includes protecting against message tampering and replay attacks. Protection against message tampering and replay attacks are covered by many of the transforms listed above where the transmitter is authenticated by using a correct pseudo-random sequence that changes from DNS transmission to transmission.

In embodiments, non-repudiation of the transmission may be achieved by the transmitter using a pseudo-random sequence that is based upon its ID (out of multiple possible choices) and/or the use of additional RF symbol(s) that are an RF signature of a message from the transmitter. For example, non-repudiation of signals may be achieved by a receiver node 104 being configured to include an additional RF symbol(s) in its DNS signal transmission that includes an RF signature of a prior DNS message it received.

Referring now to FIGS. 1 through 7, various embodiments are described.

In at least some embodiments, the system 100 is configured to use Doppler null steering methods herein in combination with two-way time-of-flight based ranging (e.g., two-way timing and ranging (TVVTR) methods to calculate range between nodes 102, 104). For example, using Doppler nulling in combination with TVVTR methods is disclosed in U.S. patent application Ser. No. 18/196,944, filed Apr. 13, 2022, which is herein incorporated by reference in its entirety.

In some embodiments, the transmitter node 102 is configured to apply the Doppler corrections to signals using Doppler null steering along a plurality of Null directions 120 based on the transmitter node's own motions (e.g., velocity and bearing relative to a common reference frame) and based on a protocol. A protocol may include a scanning sequence of the null direction 120 such that each pulse of a signal has a Doppler correction applied to it that is configured to cancel out the real-world Doppler effects of the transmitter node's own velocity relative to a common reference frame along each null direction 120 of the scanning sequence. For example, as described in U.S. patent application Ser. No. 18/130,285, filed Apr. 3, 2023, which is herein incorporated by reference in its entirety, embodiments may utilize time synchronized scanning sequences along a plurality of Null directions 120. In some embodiments, a zero value or near zero value (e.g., or the like such as a zero crossing) of a calculated net frequency shift of a received signal is used to determine a bearing angle between the source (e.g., Tx node 102) and the receiving node 104 using a time-of-arrival of the received signal.

The protocol may include protocol modulations. For example, the protocol modulations may be changes to a protocol configured to increase security of communications. For instance, a variety of transforms may be applied to a signal or protocol such that it is impractical for an adversarial node to compromise (e.g., intercept, detect, read, adjust/change, spoof, and/or the like) a protocol or signal thereof.

In embodiments of the system 100, generally unless otherwise noted, for any protocol modulation described herein, the transmitter node 102 may be configured to use/employ the protocol modulation and/or the receiver node 104 may be configured to receive, decode, understand, detect, and/or the like signals transmitted using the protocol modulation. For example, for a frequency hopping protocol modulation, the receiver node 104 may be time synchronized to receive (i.e., listen for) signals at each frequency used in the frequency hopping protocol modulation.

In some embodiments, the protocol modulation includes added pseudo-random noise to the signals. The noise may help mask the signal from being detected, mask the protocol used, and/or the like. For example, the transmitter node may be configured to add in phase signals that appear to be noise but are known to the receiver node 104 according to the protocol. The receiver node 104 may be configured to filter out this particular type of noise by using prior knowledge of the noise. The receiver node 104 may use the noise itself to aide in detecting the signal such as using a correlator configured to detect the noise. In some embodiments, the noise may include symbols (e.g., symbols similar to those expected from other nearby transmitters) to the signals. For instance, the symbols may include information (e.g., the symbols may be encoded according to a pseudo-random symbol encoding protocol to include decodable bits of information corresponding to decodable information). For example, the symbols may encode information corresponding to a position of the transmitter node 102. For instance, the symbols may be similar symbols from other known transmitters (including their position so that receivers can subtract/eliminate the noise/symbols) so that the expected SNR function over time will vary.

In some embodiments, the protocol modulation includes a transform of times of arrival of pulses of the signals. For example, the transform may be similar to pulse position modulation (PPM) of pulses of the signals such that positions in time of the pulses encode information for increased security, rather than necessarily just sending other information. For instance, the encoded information may be used to establish which protocol modulations (e.g., which frequency hops, amplitude transforms, scanning sequences, etc.) are being used, to decrease the chance that adversarial nodes may know the protocol modulations ahead of time, for increased security of the signals.

In some embodiments, the protocol modulation includes a transform of a frequency (and/or phase) of the signals. For example, the protocol modulation may include frequency hopping (e.g., using different frequencies at different times) and spread spectrum coding. For instance, the frequency hopping may mean using a first common reference frequency at a first time and a second different common reference frequency at a second time. This is a nonlimiting example, and any number of frequency hops such as smoothly varying the frequency, and/or sharp changes to the frequency may be used generally.

The signals based on Doppler nulling may include (or be paired with) symbols.

In some embodiments, the protocol modulation includes at least one of non-periodic or non-constant bandwidth symbols of the signals. The protocol modulation approach may permit variations in symbol structure or the bandwidth utilized for signal transmission. For example, non-periodic symbols include that the time intervals separating the symbols are irregular or unfixed, which can contribute to decreased signal predictability and potentially enhance resistance to interference or unauthorized access. Conversely, non-constant bandwidth symbols may include that the frequency spectrum portion used for transmitting each symbol may differ. This adaptability can be advantageous for adjusting to fluctuating channel conditions or optimizing the usage of available bandwidth.

In some embodiments, the protocol modulation includes a transform of an amplitude of the signals configured to vary a signal to noise ratio of the signals over time. For example, the amplitude of pulses of the signal may be adjusted over time (e.g., each pulse with a different amplitude) so that the expected SNR function over time will vary. For instance, the amplitude may be transformed so as to not look like a sine curve unless the receiver node 104 adjusts its receiver signal strength accordingly according to the protocol. In this regard, the non-sine wave signal may be more secure and difficult to detect and/or decode.

In some embodiments, the protocol modulation includes a transform of a sequence of the plurality of the Null directions 120. For example, the transform may be pseudo random. For instance, instead of using a sequence of incremental Null directions 120 (e.g., 10, 20, 30, 40 . . . degrees), the protocol modulation may include using a pseudo random sequence (e.g., 10, 21, 29, 40, 50 . . . ; 10, 90, 250, 40, 320, 20, . . . ; and/or the like). The sequence may be configured to confuse an adversarial node such as to make reordering the sequence impractical and/or to give inaccurate spatial awareness if an incremental sequence is assumed but not actually used.

In some embodiments, the protocol modulation includes a transform of sequence of what Doppler correction is used over time. For example, the amount of Doppler corrections applied in proportion to the transmitter node's 102 own motions may be adjusted overtime according to the protocol. For instance, the Doppler corrections may be adjusted according to a pattern such as a smoothly varying and/or pseudo-random pattern. For example, signals sent with null directions 120 in a southern direction may have twice the Doppler corrections applied and in a northern direction half the Doppler corrections applied. The receiver node 104 may be configured to mathematically account for this change to decode (e.g., undo) the protocol modulation of the Doppler corrections used. This is a nonlimiting example, and any Doppler correction protocol modulation may be used, such as adjusting the modulation each cycle, every other cycle, in any Null direction 120 using any formula at any time, and/or the like.

In some embodiments, the protocol modulation includes adding one or more symbols to the signals configured to be used for error correction and/or identification (of the transmitter node 102). These added symbols can enhance the robustness and reliability of the communication system. Error correction symbols, such as, but not necessarily limited to, parity bits, help detect and fix transmission errors, ensuring accurate data transfer. Identification symbols, such as, but not necessarily limited to, headers, aid in distinguishing signal sources or types, enabling efficient routing and processing.

Examples of doppler nulling methods include, but are not limited to, methods and other descriptions (e.g., at least some theory and mathematical basis) are disclosed in U.S. patent application Ser. No. 17/233,107, filed Apr. 16, 2021, which is hereby incorporated by reference in its entirety; U.S. patent application Ser. No. 17/534,061, filed Nov. 23, 2021, which is hereby incorporated by reference in its entirety; and U.S. patent application Ser. No. 17/857,920, filed Jul. 5, 2022, which is hereby incorporated by reference in its entirety. In embodiments, doppler nulling methods allow for benefits such as, but not limited to, relatively quickly and/or efficiently detecting transmitter nodes and determining transmitter node attributes (e.g., transmitter node speed, transmitter node bearing, relative bearing of transmitter node relative to receiver node, relative distance of transmitter node relative to receiver node, and the like).

For at least purposes of this disclosure, 'Doppler nulling' means 'Doppler null steering', 'Doppler null scanning', and the like.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

We claim:

1. A system comprising:
a transmitter node and a receiver node, wherein each node of the transmitter node and the receiver node comprises:
  a communications interface comprising at least one antenna element; and
  a controller operatively coupled to the communications interface, the controller including one or more processors, wherein the controller has information of own node velocity and own node orientation;
wherein each node of the transmitter node and the receiver node are in motion relative to each other,
wherein each node of the transmitter node and the receiver node are time synchronized to apply Doppler corrections associated with said node's own motions relative to a common reference frame, wherein the transmitter node is configured to apply the Doppler corrections to signals using Doppler null steering along a plurality of Null directions based on the transmitter node's own motions and based on a protocol,
wherein the common reference frame is known to the transmitter node and the receiver node prior to the transmitter node transmitting the signals to the receiver node and prior to the receiver node receiving the signals from the transmitter node,
wherein the receiver node is configured to determine a relative position of the transmitter node based on the signals based on the Doppler null steering based on the protocol,
wherein the protocol comprises a protocol modulation, and wherein the receiver node is configured to receive the signals transmitted based on the protocol modulation.

2. The system of claim 1, wherein the protocol modulation comprises added pseudo-random noise to the signals, wherein the pseudo-random noise comprises pseudo-random symbols known to the transmitter node and the receiver node prior to the transmitter node transmitting the signals to the receiver node and prior to the receiver node receiving the signals from the transmitter node.

3. The system of claim 1, wherein the protocol modulation comprises a transform of a time of arrival of the signals.

4. The system of claim 1, wherein the protocol modulation comprises a transform of a frequency of the signals.

5. The system of claim 1, wherein the protocol modulation comprises a differing frequency spectrum bandwidth.

6. The system of claim 1, wherein the protocol modulation comprises a transform of an amplitude of each pulse of the signals to vary over time.

7. The system of claim 1, wherein the protocol modulation comprises a transform of a sequence of the plurality of the Null directions.

8. A system comprising:
a receiver node comprising:
  a communications interface comprising at least one antenna element; and
  a controller operatively coupled to the communications interface, the controller including one or more processors, wherein the controller has information of own node velocity and own node orientation relative to a common reference frame;
  wherein the receiver node is time synchronized to apply Doppler corrections associated with the receiver node's own motions relative to the common reference frame,
  wherein the common reference frame is known to the receiver node prior to the receiver node receiving signals from a transmitter node,
    wherein the receiver node is configured to process the signals according to the Doppler corrections to the signals applied using Doppler null steering along a plurality of Null directions based on the transmitter node's own motions and based on a protocol,
    wherein the receiver node is configured to determine a relative position of the transmitter node based on the signals based on the Doppler null steering based on the protocol,
    wherein the protocol comprises a protocol modulation, and wherein the receiver node is configured to receive the signals transmitted based on the protocol modulation.

9. The system of claim 8, wherein the protocol modulation comprises added pseudo-random noise to the signals, wherein the pseudo-random noise comprises pseudo-random symbols known to the transmitter node and the receiver node prior to the transmitter node transmitting the signals to the receiver node and prior to the receiver node receiving the signals from the transmitter node.

10. The system of claim 8, wherein the protocol modulation comprises a transform of a time of arrival of the signals.

11. The system of claim 8, wherein the protocol modulation comprises a transform of a frequency of the signals.

12. The system of claim 8, wherein the protocol modulation comprises a differing frequency spectrum bandwidth.

13. The system of claim 8, wherein the protocol modulation comprises a transform of an amplitude of each pulse of the signals to vary over time.

14. The system of claim 8, wherein the protocol modulation comprises a transform of a sequence of the plurality of the Null directions.

15. A system comprising:

a transmitter node comprising:

a communications interface comprising at least one antenna element; and a controller operatively coupled to the communications interface, the controller including one or more processors, wherein the controller has information of own node velocity and own node orientation relative to a common reference frame;

wherein the common reference frame is known to a receiver node prior to the receiver node receiving signals from the transmitter node, wherein the transmitter node is time synchronized to apply Doppler corrections associated with the transmitter node's own motions relative to a common reference frame, wherein the transmitter node is configured to apply the Doppler corrections to signals using Doppler null steering along a plurality of Null directions based on the transmitter node's own motions and based on a protocol, wherein the protocol comprises a protocol modulation, and wherein the receiver node is configured to receive the signals transmitted based on the protocol modulation.

16. The system of claim 15, wherein the protocol modulation comprises added pseudo-random noise to the signals, wherein the pseudo-random noise comprises pseudo-random symbols known to the transmitter node and the receiver node prior to the transmitter node transmitting the signals to the receiver node and prior to the receiver node receiving the signals from the transmitter node.

17. The system of claim 15, wherein the protocol modulation comprises a transform of a time of arrival of the signals.

18. The system of claim 15, wherein the protocol modulation comprises a transform of a frequency of the signals.

19. The system of claim 15, wherein the protocol modulation comprises a differing frequency spectrum bandwidth.

20. The system of claim 15, wherein the protocol modulation comprises a transform of an amplitude of each pulse of the signals to vary over time.

* * * * *